US012468501B2

(12) United States Patent
Hirai et al.

(10) Patent No.: US 12,468,501 B2
(45) Date of Patent: Nov. 11, 2025

(54) INPUT DISPLAY CONTROL DEVICE, INPUT DISPLAY CONTROL METHOD, AND INPUT DISPLAY SYSTEM

(71) Applicant: Mitsubishi Electric Corporation, Tokyo (JP)

(72) Inventors: Masato Hirai, Tokyo (JP); Tsutomu Matsubara, Tokyo (JP); Takashi Yamauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 107 days.

(21) Appl. No.: 18/187,703

(22) Filed: Mar. 22, 2023

(65) Prior Publication Data

US 2023/0229380 A1 Jul. 20, 2023

Related U.S. Application Data

(63) Continuation of application No. PCT/JP2020/043229, filed on Nov. 19, 2020.

(51) Int. Cl.
*G06F 3/14* (2006.01)
*G06T 3/40* (2006.01)
(Continued)

(52) U.S. Cl.
CPC ............ *G06F 3/1462* (2013.01); *G06T 3/40* (2013.01); *G06T 11/203* (2013.01); *G06F 3/04845* (2013.01)

(58) Field of Classification Search
CPC .. G06F 3/1462; G06F 3/04845; G06F 3/0487; G06F 3/0481; G06F 3/1454;
(Continued)

(56) References Cited

U.S. PATENT DOCUMENTS 11,393,230 B2 7/2022 Hirai
2008/0291221 A1 11/2008 Yamada et al.
(Continued)

FOREIGN PATENT DOCUMENTS

JP 2008-210143 A 9/2008
JP 2012-018587 A 1/2012
(Continued)

OTHER PUBLICATIONS

Office Action issued Jun. 26, 2024 in European Patent Application No. 20 962 444.4, 10 pages.
(Continued)

*Primary Examiner* — William A Beutel
(74) *Attorney, Agent, or Firm* — XSENSUS LLP

(57) ABSTRACT

A display control unit sets a first virtual region around a display region of a display, sets, as a second virtual region, a region which is a part of the display region and which does not display information shared with a terminal of a communication partner in order to match an aspect ratio with that of the terminal of the communication partner, in a case where it is determined that a part of a character string protrudes from the display region, extends a curve to any one of the first virtual region, the second virtual region, and the first virtual region straddling the second virtual region, and generates display information in which the part of the character string is disposed along the extended curve in any one of the first virtual region, the second virtual region, and the first virtual region straddling the second virtual region.

7 Claims, 20 Drawing Sheets

(51) Int. Cl.
*G06T 11/20* (2006.01)
*G06F 3/04845* (2022.01)

(58) Field of Classification Search
CPC ...... G06F 3/04883; G06F 3/0488; G06F 3/14; G06T 3/40; G06T 11/203; G10L 15/26; G09G 5/08; G09G 5/26; G09G 5/38; G09G 2340/0442; G09G 2340/0464
See application file for complete search history.

(56) References Cited

U.S. PATENT DOCUMENTS

| | | | | |
|---|---|---|---|---|
| 2013/0212522 | A1* | 8/2013 | Fleizach | G06F 3/0484 715/800 |
| 2014/0359493 | A1 | 12/2014 | Hong et al. | |
| 2017/0091153 | A1* | 3/2017 | Thimbleby | G06F 3/04845 |
| 2019/0012075 | A1* | 1/2019 | Hirai | G06F 40/109 |
| 2021/0248407 | A1 | 8/2021 | Hirai | |

FOREIGN PATENT DOCUMENTS

| | | | |
|---|---|---|---|
| JP | 2015-019199 | A | 1/2015 |
| JP | 2015064841 | A * | 4/2015 |
| JP | 6641530 | B1 | 2/2020 |

OTHER PUBLICATIONS

Office Action mailed Nov. 6, 2023, in European Patent Application No. 20962444.4, 10 pages.
International Search Report and Written Opinion mailed on Jan. 26, 2021, received for PCT Application PCT/JP2020/043229, filed on Nov. 19, 2020, 9 pages including English Translation.
Notice of Reasons for Refusal mailed on Jul. 6, 2021, received for JP Application 2021-514638, 7 pages including English Translation.
Office Action issued on Feb. 25, 2025, in corresponding Chinese patent Application No. 202080107030.6, 18 pages.
Office Action issued Jul. 29, 2025 in Chinese Patent Application No. 202080107030.6, 15 pages.

* cited by examiner

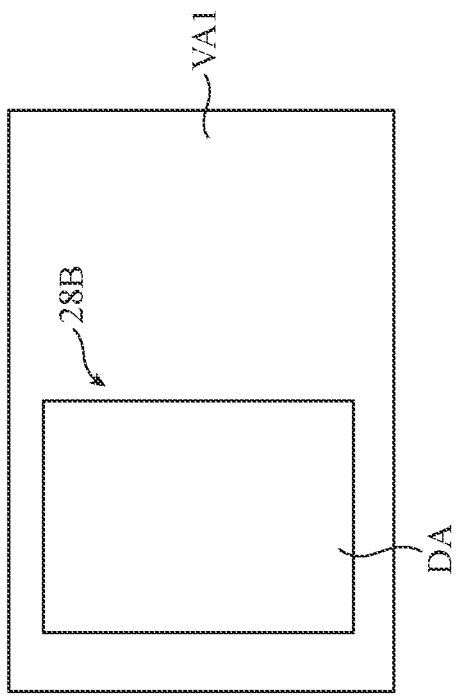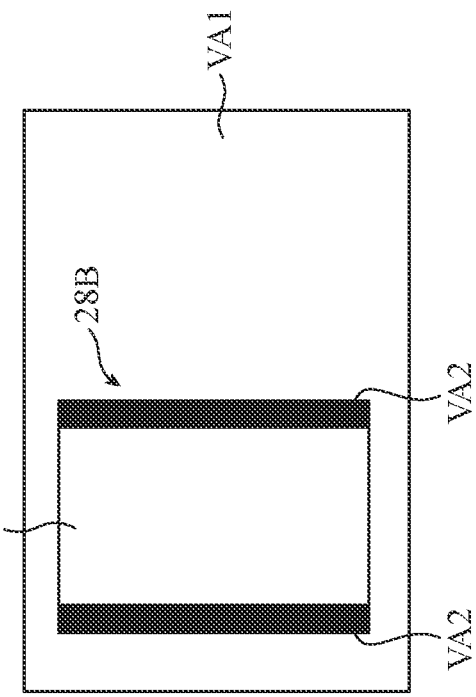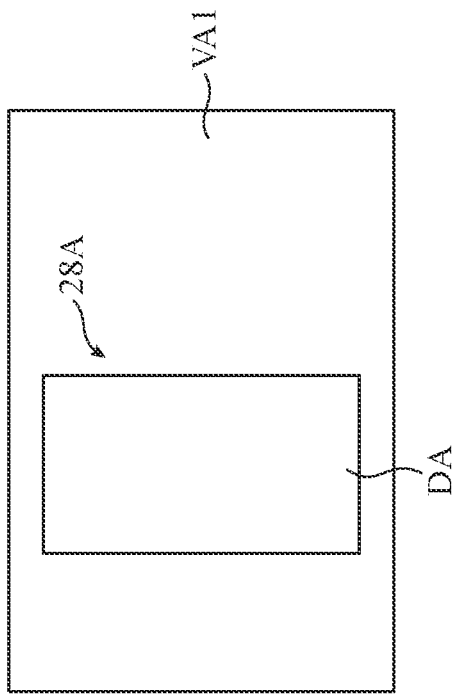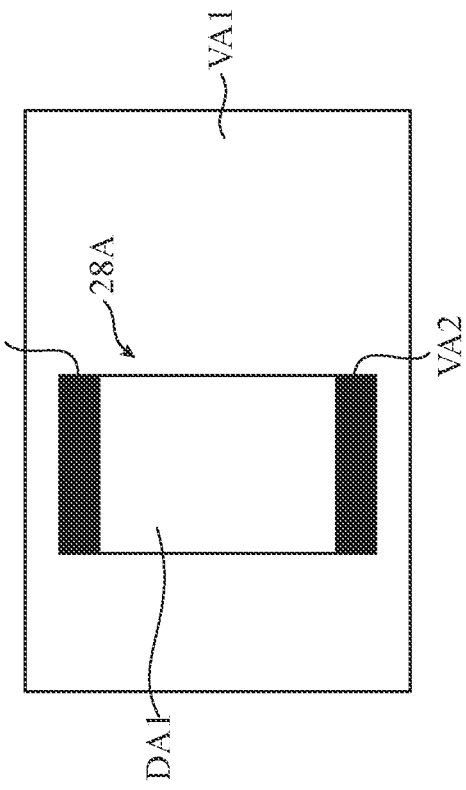

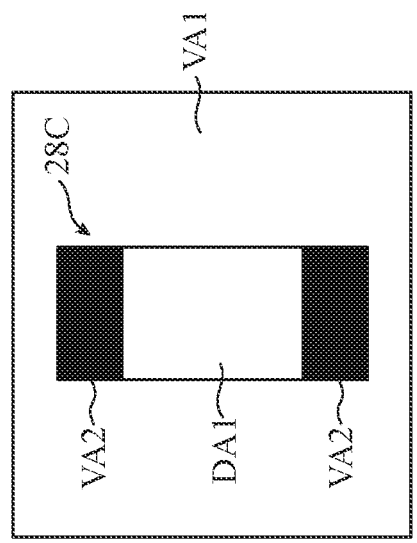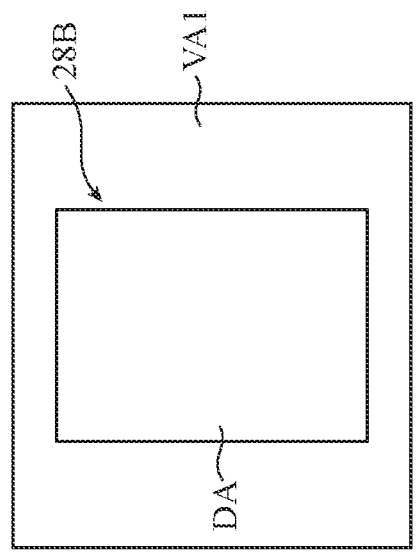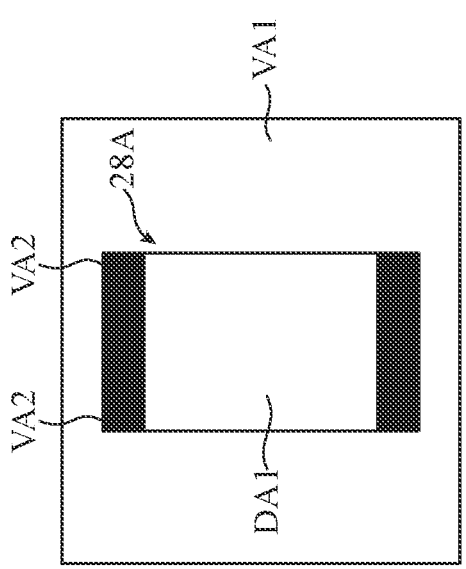

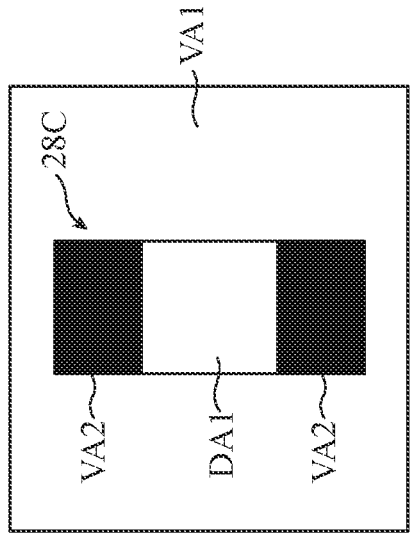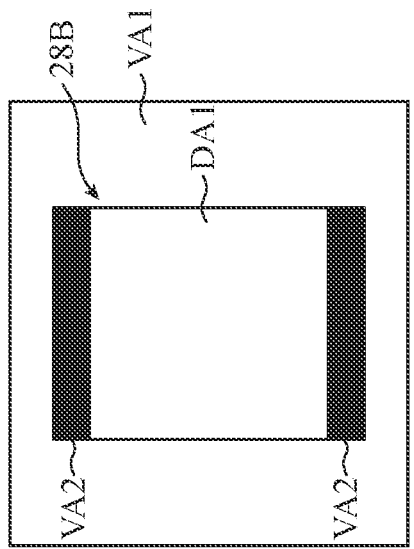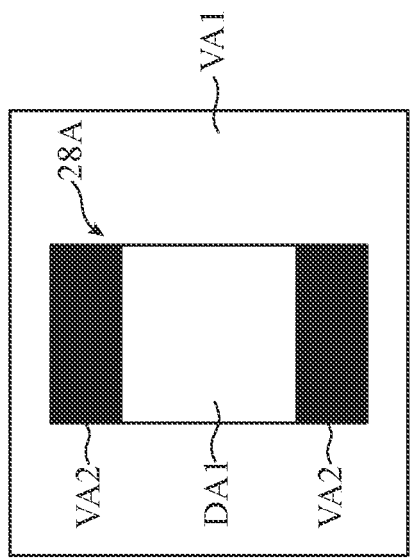

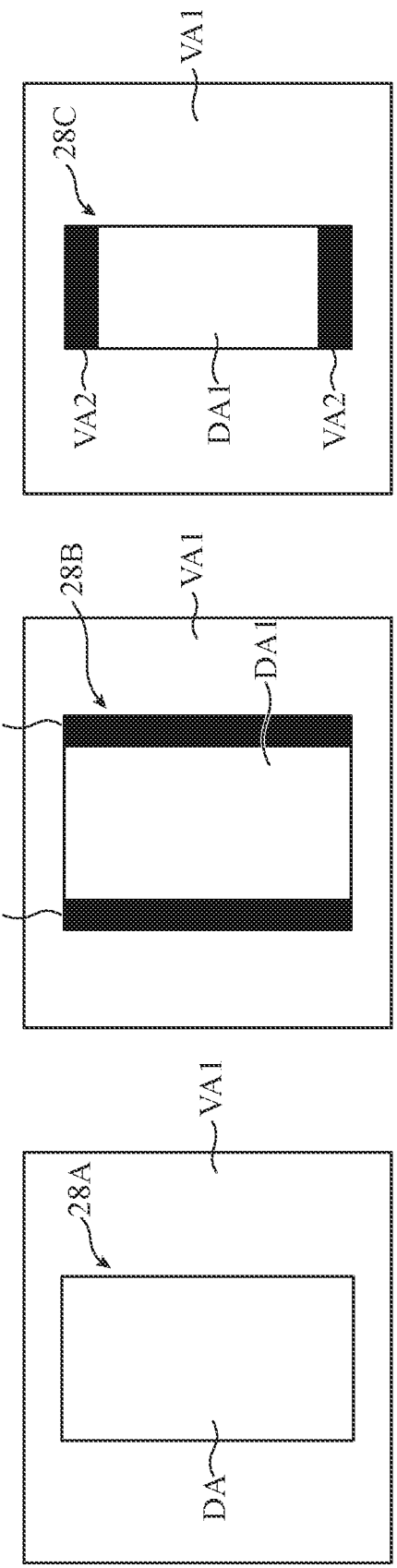

INPUT DISPLAY CONTROL DEVICE, INPUT DISPLAY CONTROL METHOD, AND INPUT DISPLAY SYSTEM

CROSS-REFERENCE TO RELATED APPLICATION

The present application is a bypass continuation of PCT filing PCT/JP2020/043229, filed on Nov. 19, 2020, the entire contents of which is hereby incorporated by reference.

TECHNICAL FIELD

The present disclosure relates to an input display control device, an input display control method, and an input display system.

BACKGROUND ART

As a technique for displaying a character string along a designated shape on a display region of a display, for example, there is a technique described in Patent Literature 1. The input display control device described in Patent Literature 1 generates display information for displaying a character string along a curve indicating a path traced on a display region of a display, and displays the character string on the display in accordance with the generated display information.

In addition, a system that performs so-called mirroring display in which communication is performed between terminals and the same display information is displayed on both terminals is utilized. In the mirroring display, the transmitting terminal transmits the display information to the receiving terminal, and the receiving terminal displays the display information received from the transmitting terminal.

CITATION LIST

Patent Literature

Patent Literature 1: Japanese Patent No. 6641530

SUMMARY OF INVENTION

Technical Problem

In a case where aspect ratios (screen aspect ratios) of displays of terminals that perform mirroring display are different from each other, both terminals cannot share the same display information. For example, in one terminal, the entire character string is displayed in the display region, whereas in the other terminal, a part of the character string might protrude from the display region, and thereby the entire character string may fail to be visually recognized. For this reason, the displays of the terminals that perform the mirroring display are often converted into the same aspect ratio.

In a case where different aspect ratios are matched to the same aspect ratio, depending on the aspect ratio of the display, a partial region, in which display information shared with the terminal of a communication partner is not displayed but a black belt image or the like is displayed, is set, separately from a region in which the display information is displayed. Hereinafter, the partial region of the display, in which the display information shared with the terminal of the communication partner is not displayed, will be referred to as an "aspect ratio adjusting display region."

Moreover, as the terminal that performs mirroring display, a terminal whose display is controlled by the input display control device described in Patent Literature 1 can be used. The input display control device described in Patent Literature 1 generates display information in which a part of a character string to be displayed is virtually disposed in a virtual region set around a display region of the display, in a case where the part of the character string protrudes from the display region. This display information is display information for displaying the entire character string.

However, the above-described aspect ratio adjusting display region is a display region in the screen of the display. Thus, the input display control device described in Patent Literature 1 has a problem that when a part of the character string to be displayed protrudes into the aspect ratio adjusting display region, display information for displaying the entire character string including the part protruding into the aspect ratio adjusting display region cannot be generated.

The display information is information necessary for displaying the entire character string in a region which is in the display region of the display and which is other than the aspect ratio adjusting display region. For example, the input display control device performs a process of moving the entire character string to a display region other than the aspect ratio adjusting display region, a process of reducing the size of the characters constituting the character string, a process of putting a part of the character string on a new line, and the like, by using the display information.

The present disclosure solves the above-described problem, and an object of the present disclosure is to provide an input display control device, an input display control method, and an input display system capable of generating display information for displaying an entire character string to be displayed even when a part of the character string to be displayed protrudes into a part of a display region where display information is not displayed in order to match an aspect ratio with that of a terminal of a communication partner.

Solution to Problem

An input display control device according to the present disclosure includes: processing circuitry to acquire curve information indicating a curve; to acquire a character string; and to generate display information for displaying the character string along the curve indicated by the curve information, in which the processing circuitry sets a first virtual region around a display region of a display, sets, as a second virtual region, a region which is a part of the display region of the display and which does not display information shared with a terminal of a communication partner in order to match an aspect ratio with an aspect ratio of the terminal of the communication partner, in a case where it is determined that a part of the character string protrudes from a remaining region of the display region because a length of the curve reaching an end of the remaining region of the display region of the display is shorter than a length of the character string, extends the curve to any one of the first virtual region, the second virtual region, and the first virtual region straddling the second virtual region, the remaining region of the display region being a region obtained by removing the second virtual region from the display region in which the second virtual region is set, and generates display information in which the part of the character string is virtually disposed along the extended curve in any one of the first virtual region, the second virtual region, and the first virtual region straddling the second virtual region.

Advantageous Effects of Invention

According to the present disclosure, the processing circuitry sets the first virtual region around the display region of the display, and sets, as the second virtual region, the region which is the part of the display region of the display and which does not display the display information shared with the terminal of the communication partner in order to match the aspect ratio with that of the terminal of the communication partner. Then, in a case where it is determined that the part of the character string protrudes from the remaining region of the display region because the length of the curve reaching the end of the remaining region of the display region of the display is shorter than the length of the character string, the processing circuitry extends the curve to any one of the first virtual region, the second virtual region, and the first virtual region straddling the second virtual region, and generates the display information in which the part of the character string is virtually disposed along the extended curve in any one of the first virtual region, the second virtual region, and the first virtual region straddling the second virtual region. Thus, the input display control device according to the present disclosure can generate the display information for displaying the entire character string to be displayed, even in a case where a part of the character string to be displayed protrudes into the part of the display region where the display information is not displayed in order to match the aspect ratio with that of the terminal of the communication partner.

BRIEF DESCRIPTION OF DRAWINGS

FIG. 7A is a screen view illustrating a screen example in a case where a terminal included in the input display system according to the first embodiment is a smartphone, FIG. 7B is a screen view illustrating a screen example in a case where a terminal included in the input display system according to the first embodiment is a tablet terminal, FIG. 7C is a screen view illustrating a screen example in a case where the aspect ratio of the screen of the smartphone is set to 4:3, and FIG. 7D is a screen view illustrating a screen example in a case where the aspect ratio of the screen of the tablet terminal is set to 16:9.

FIGS. 18A to 18C are screen views illustrating screen examples when the aspect ratio of each of the screens of the three terminals is set to 4:3.

FIGS. 19A to 19C are screen views illustrating screen examples when the aspect ratio of each of the screens of the three terminals is set to 1:1.

FIGS. 20A to 20C are screen views illustrating screen examples when the aspect ratio of each of the screens of the three terminals is set to a ratio calculated from the aspect ratios of the three terminals.

DESCRIPTION OF EMBODIMENTS

First Embodiment

Figure 1:
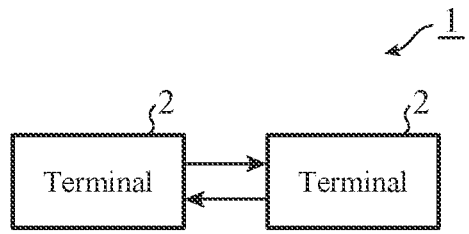
FIG. 1 is a block diagram illustrating a configuration of an input display system according to a first embodiment.

FIG. 1 is a block diagram illustrating a configuration of an input display system 1 according to a first embodiment. The input display system 1 illustrated in FIG. 1 is a system in which terminals 2 share the same display information on their respective displays by communication. In the input display system 1, the terminal 2 on the transmission side transmits display information indicating contents displayed on the display to the terminal 2 on the reception side, and the terminal 2 on the reception side displays the same contents as the terminal 2 on the transmission side on the display in accordance with the display information received from the terminal 2 on the transmission side. That is, so-called mirroring display is performed in the input display system 1.

Although FIG. 1 illustrates a case where two terminals 2 communicate with each other, three or more terminals 2 may share display information of each other in the input display system 1.

The terminal 2 is, for example, a smartphone, a tablet terminal, or a personal computer (PC). In the input display system 1, in a case where one terminal 2 is a smartphone and the other terminal 2 is a tablet terminal, aspect ratios of the displays are different from each other. In this case, in one terminal 2, the entire character string is displayed in the display region of the display, whereas in the other terminal 2, a part of the character string might protrude from the display region of the display, and thereby the entire character string may fail to be visually recognized. Therefore, the displays of the terminals 2 are converted into the same aspect ratio.

Moreover, the terminal 2 includes an input display control device according to the first embodiment. The input display control device accepts an operation (tracing operation) of drawing a line by using a pointing device and displays, in the display region of the display, a character string along a curve designated by the accepted operation. As the pointing device, for example, a touch panel is assumed. However, this is merely an example, and the pointing device may be a joystick, a pointing stick, a touchpad, a stylus, a data glove, a trackball, a pen tablet, a mouse, a light pen, or a joypad.

In the terminal 2, when a display having a large aspect ratio is adjusted to have a small aspect ratio, an aspect ratio adjusting display region is set in the display region. The aspect ratio adjusting display region is set in the display region of the display separately from a region in which the display information shared with the terminal 2 of the communication partner is displayed. The aspect ratio adjusting display region does not display the display information shared with the terminal 2 of the communication partner. The conventional input display control device described in Patent Literature 1 assumes all regions other than a display region of a display in a plane including the display region as a virtual region, and generates display information in which a part of a character string to be displayed is virtually disposed in the virtual region in a case where the part of the character string to be displayed protrudes into the virtual region.

On the other hand, the aspect ratio adjusting display region is a part of the display region of the display. In the algorithm of the conventional input display control device, since the virtual region is set around the display region of the display, only display information in which a character string is partially disposed in the aspect ratio adjusting display region is generated when a black belt image or the like is not displayed in the aspect ratio adjusting display region. In accordance with the display information, the display displays a part of the character string in the aspect ratio adjusting display region.

Therefore, the input display control device included in the terminal 2 sets a first virtual region around the display region of the display, and sets, as a second virtual region, the aspect ratio adjusting display region that does not display the display information shared with the terminal 2 of the communication partner in the display region of the display. Then, in a case where the input display control device included in the terminal 2 determines that a part of a character string protrudes from the display region because the length of the curve reaching the end of the display region of the display is shorter than the length of the character string, the input display control device extends the curve and generates display information in which the part of the character string is virtually disposed in any one of the first virtual region, the second virtual region, and the first virtual region straddling the second virtual region, along the extended curve. Thus, even in a case where a part of the character string to be displayed protrudes into the aspect ratio adjusting display region, display information for displaying the entire character string to be displayed can be generated.

Figure 2:
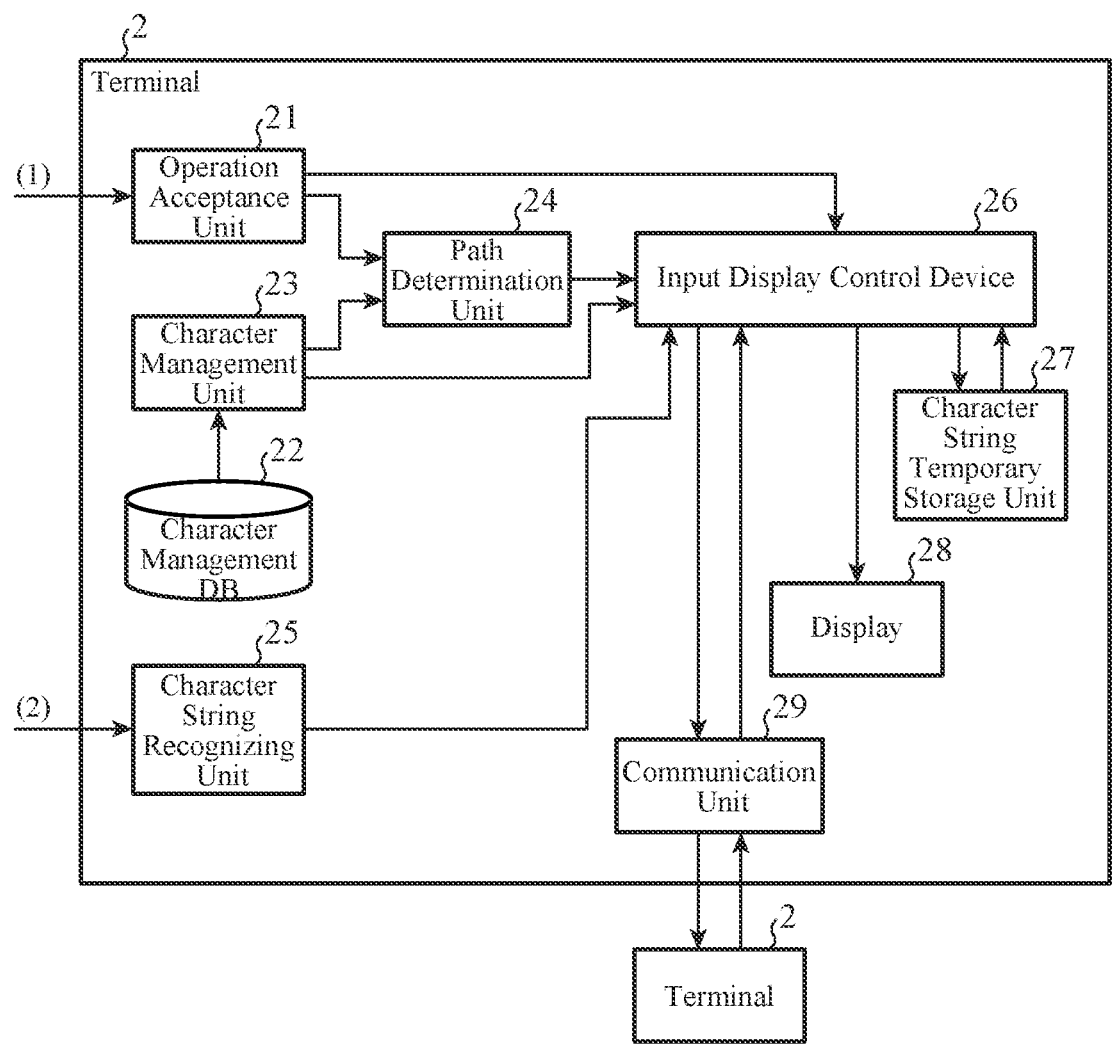
FIG. 2 is a block diagram illustrating a configuration of a terminal including an input display control device according to the first embodiment.

FIG. 2 is a block diagram illustrating a configuration of the terminal 2 including the input display control device 26. The terminals 2 included in the input display system 1 illustrated in FIG. 1 both have the components illustrated in FIG. 2. The terminal 2 includes an operation acceptance unit 21, a character management database 22 (hereinafter, it is referred to as a character management DB 22), a character management unit 23, a path determination unit 24, a character string recognizing unit 25, the input display control device 26, a character string temporary storage unit 27, a display 28, and a communication unit 29.

The operation acceptance unit 21 accepts an operation (1) of tracing a line as a user's operation, and outputs the content of the accepted operation to the path determination unit 24. The operation acceptance unit 21 accepts, for example, an operation (1) using a pointing device. The character management DB 22 is a database in which character attribute table information indicating a correspondence among a character type, a character size, a character height, and a character width is registered. In the character management unit 23, the character size of characters to be displayed on the display 28 is set in advance. By referring to the character attribute table information registered in the character management DB 22, the character management unit 23 outputs character attribute information indicating the character height corresponding to the preset character size to the path determination unit 24, and outputs character attribute information indicating the character height and the character width corresponding to the preset character size to the input display control device 26.

The path determination unit 24 determines the path of the line input on the display region of the display 28 by the operation accepted by the operation acceptance unit 21. For example, the path determination unit 24 acquires time series data of the point cloud constituting the line input by the user's operation from a pointing device. On the basis of the time series data of the point cloud acquired from the pointing device, the path determination unit 24 generates curve information indicating the length and shape of a curve representing the path of the line input by the user's operation, and outputs the generated curve information to the input display control device 26. The curve also includes a straight line or a bent line. That is, the curve determined by the path determination unit 24 includes lines of various shapes that can be calculated using the time series data of the point cloud on the display region of the display 28.

Moreover, the path determination unit 24 generates a curve image obtained by imaging the curve representing the path. The curve image is, for example, an image in which the curve representing the path is represented by a bold line. Note that the line width of the curve image corresponds to the character height indicated by the character attribute information output from the character management unit 23. The curve information output to the input display control device 26 is information including the curve image.

Figure 3:
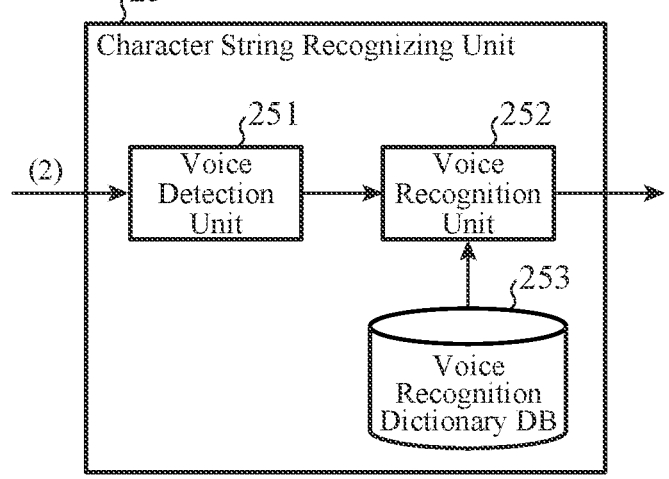
FIG. 3 is a block diagram illustrating a configuration of a character string recognizing unit according to the first embodiment.

The character string recognizing unit 25 performs recognition processing by inputting the voice (2), and outputs a character string indicating a recognition result of the voice (2) to the input display control device 26 as a character string to be displayed. FIG. 3 is a block diagram illustrating a configuration of the character string recognizing unit 25. As illustrated in FIG. 3, the character string recognizing unit 25 includes a voice detection unit 251, a voice recognition unit 252, and a voice recognition dictionary database 253 (hereinafter referred to as a voice recognition dictionary DB 253).

The voice detection unit 251 detects the user's voice (2) and outputs the detected voice (2) to the voice recognition unit 252. In the voice recognition dictionary DB 253, for example, an acoustic model and a recognition dictionary are registered. In the acoustic model, acoustic features of phonemes, which are units of human vocalization, are described. In the recognition dictionary, words for voice recognition are described. The voice recognition unit 252 has a voice recognition engine that recognizes the voice (2) detected by voice detection unit 251.

The voice recognition unit 252 analyzes the voice (2) detected by the voice detection unit 251, calculates an acoustic feature of the voice (2), and searches for a word having an acoustic feature closest to the calculated acoustic feature from words described in the recognition dictionary registered in the voice recognition dictionary DB 253. The voice recognition unit 252 outputs a character string indicating the word, which is searched for, to the input display control device 26 as a character string indicating a voice recognition result.

The character string recognizing unit 25 illustrated in FIG. 3 includes the voice recognition unit 252 and the voice recognition dictionary DB 253. However, this is an example, and the character string recognizing unit 25 may be a character string recognizing unit 25 including a data transmission and reception unit instead of the voice recognition unit 252 and the voice recognition dictionary DB 253. The data transmission and reception unit is a communication device capable of transmitting and receiving data to and from a voice recognition server (not shown) via a communication line such as the Internet, and may be, for example, the communication unit 29. The data transmission and reception unit transmits data indicating the voice (2) detected by the voice detection unit 251 to the voice recognition server. The voice recognition server includes a voice recognition engine that recognizes voice. When receiving the data indicating the voice (2) transmitted from the data transmission and reception unit, the voice recognition server recognizes the voice (2) indicated by the received data and transmits a character string indicating a recognition result of the voice (2) to the data transmission and reception unit. The data transmission and reception unit outputs the character string indicating the recognition result of the voice received from the voice recognition server to the input display control device 26.

In addition to acquiring a character string by voice recognition, the character string recognizing unit 25 may accept input of a character string using a software keyboard or a hardware keyboard, and output the accepted character string to the input display control device 26.

The input display control device 26 sets the first virtual region around the display region of the display 28 and sets the second virtual region in the display region of the display 28. In a case where the input display control device 26 determines that a part of the character string protrudes from the display region because the length of the curve reaching the end of the display region of the display 28 is shorter than the length of the character string, the input display control device 26 extends the curve and generates display information in which the part of the character string is virtually disposed in any one of the first virtual region, the second virtual region, and the first virtual region straddling the second virtual region, along the extended curve.

The character string temporary storage unit 27 temporarily stores data indicating the character string acquired by a character string acquiring unit 262. For example, the data indicating the character string is stored in the character string temporary storage unit 27 until the curve information is output from the path determination unit 24. The display 28 displays information in accordance with the display information generated by the input display control device 26.

The communication unit 29 communicates with the terminal 2 of the communication partner. For example, the communication unit 29 transmits the aspect ratio of the display 28 included in the terminal 2 equipped with the communication unit itself to the terminal 2 of the communication partner, and receives the aspect ratio of the display 28 included in the terminal 2 of the communication partner. The aspect ratio of the display 28 included in the terminal 2 of the communication partner received by the communication unit 29 is output to the input display control device 26. As a result of comparing the aspect ratios between the terminals 2, in a case where the input display control device 26 adjusts the display region of the display 28 to be narrow in order to match the aspect ratio with that of the terminal 2 of the communication partner, the input display control device 26 sets a region for adjustment to narrow the display region as the second virtual region. The communication unit 29 transmits the display information generated by the input display control device 26 to the terminal 2 of the communication partner. The input display control device 26 displays the display content of the terminal 2 of the communication partner in the display region of the display 28, in accordance with display information received from the terminal 2 of the communication partner.

Figure 4:
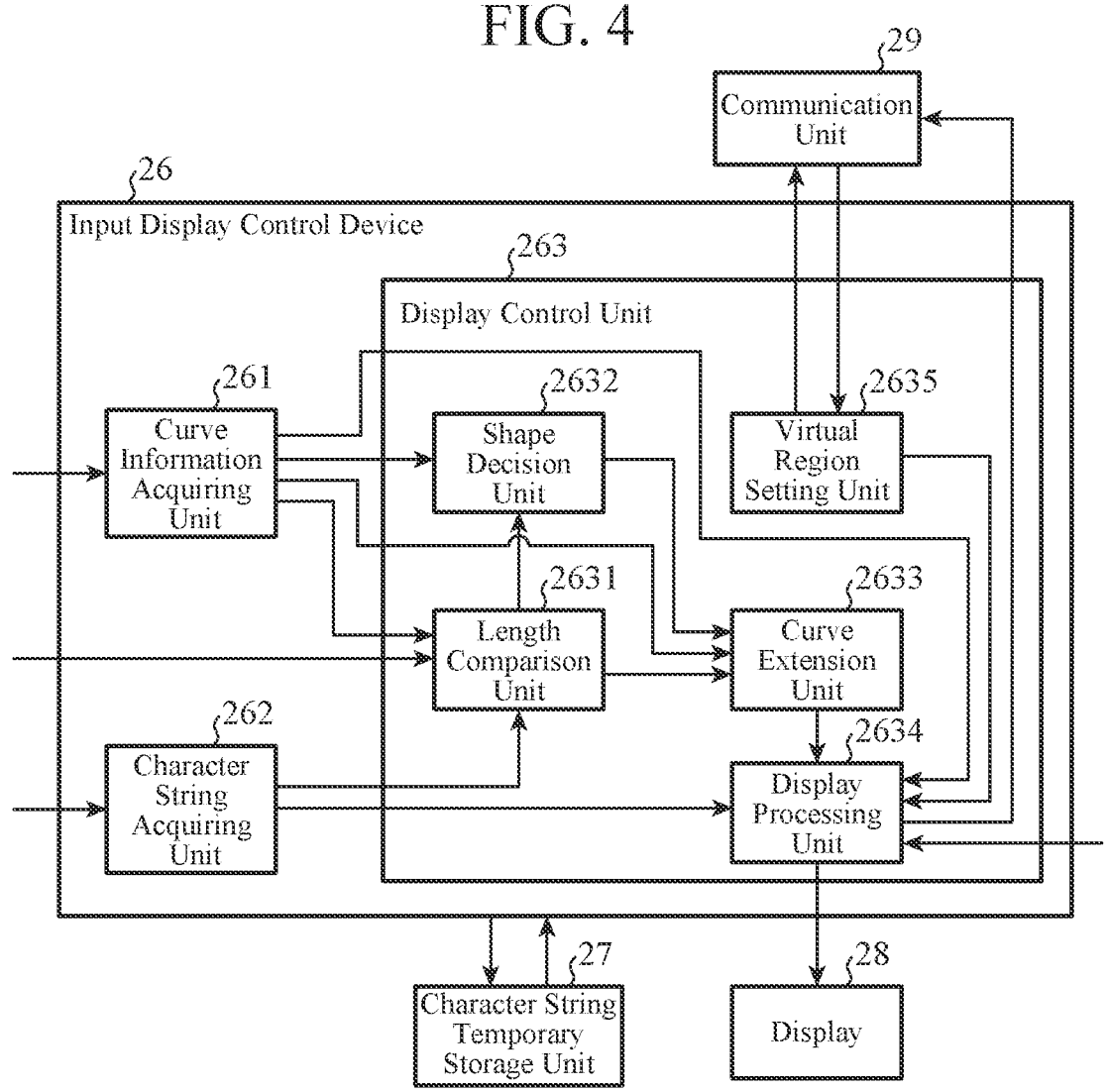
FIG. 4 is a block diagram illustrating a configuration of the input display control device according to the first embodiment.

FIG. 4 is a block diagram illustrating a configuration of the input display control device 26. The input display control device 26 includes a curve information acquiring unit 261, a character string acquiring unit 262 and a display control unit 263. The curve information acquiring unit 261 acquires the curve information generated by the path determination unit 24.

For example, the curve information acquiring unit 261 acquires the curve information from the path determination unit 24, and outputs the acquired curve information to the display control unit 263. The character string acquiring unit 262 acquires the character string recognized by the character string recognizing unit 25. For example, when acquiring the character string of the voice recognition result from the voice recognition unit 252, the character string acquiring unit 262 outputs the acquired character string to the display control unit 263.

The display control unit 263 generates display information for displaying the character string along the curve indicated by the curve information. In addition, the display control unit 263 sets the first virtual region around the display region of the display 28. The first virtual region is a region in which a part of the character string to be displayed is virtually disposed in a case where it is determined that the part of the character string to be displayed protrudes into the first virtual region because the length of the curve reaching the end of the display region of the display is shorter than the length of the character string. For example, the display control unit 263 calculates a virtual position at which the part of the character string is to be disposed in the first virtual region on the basis of a length and a shape of a portion extended to the first virtual region in the curve indicated by the curve information, and generates display information in which the character string is virtually disposed at the calculated position.

Furthermore, the display control unit 263 sets, as the second virtual region, a part of the display region of the display 28 in which the display information shared with the terminal 2 of the communication partner is not displayed in order to match the aspect ratio with that of the terminal 2 of the communication partner, that is, the aspect ratio adjusting display region. The second virtual region is a region in which a part of the character string to be displayed is virtually disposed in a case where it is determined that the part of the character string to be displayed protrudes into the second virtual region because the length of the curve reaching the end of the display region of the display 28 is shorter than the length of the character string. For example, the display control unit 263 calculates a virtual position at which the character string is to be disposed in the second virtual region or the first virtual region straddling the second virtual region on the basis of a length and a shape of a portion extended to the second virtual region or a length and a shape of a portion extended to the first virtual region straddling the second virtual region in the curve indicated by the curve information, and generates display information in which the character string is virtually disposed at the calculated position.

"Virtually disposing a part of the character string" means, for example, disposing a part of the character string at a position of the first virtual region or the second virtual region in an assumed two-dimensional coordinate system generated by assuming that the two-dimensional coordinate system in the display region (screen) of the display 28 is extended to a plane including the first virtual region and the second virtual region. "virtual position of a part of the character string" is a two-dimensional coordinate position of the extended portion of the curve in the first virtual region or the second virtual region of the two-dimensional coordinate system previously mentioned.

Further, the display control unit 263 superimposes and displays the character string on the curve image on the display 28, then generates display information for deleting the display of the curve image, and deletes the curve image on the display 28 in accordance with the generated display information. As illustrated in FIG. 4, the display control unit 263 includes a length comparison unit 2631, a shape decision unit 2632, a curve extension unit 2633, a display processing unit 2634 and a virtual region setting unit 2635.

The length comparison unit 2631 compares the length of the curve indicated by the curve information acquired by the curve information acquiring unit 261 with the length of the character string acquired by the character string acquiring unit 262, and outputs a result of the comparison between the length of the curve and the length of the character string to the shape decision unit 2632 and the curve extension unit 2633.

In a case where the comparison result output from the length comparison unit 2631 indicates that the length of the curve is shorter than the length of the character string, the shape decision unit 2632 decides the shape of the extended portion of the curve to be virtually extended to any one of the first virtual region, the second virtual region, and the first virtual region straddling the second virtual region on the basis of the shape of the curve indicated by the curve information. For example, the shape decision unit 2632 stores patterns of a plurality of curves having different shapes, collates each shape of the patterns of the plurality of curves with the shape of the curve indicated by the curve information, and thereby selects the shape of the curve indicated by the curve information from among the patterns of the plurality of curves. The shape decision unit 2632 decides the shape of the extended portion of the curve on the basis of the selected shape of the curve and outputs information indicating the extended portion for which the shape has been decided to the curve extension unit 2633.

In a case where the comparison result output from the length comparison unit 2631 indicates that the length of the curve is shorter than the length of the character string, the curve extension unit 2633 adds the extended portion whose shape has been decided by the shape decision unit 2632 to the end portion of the curve indicated by the curve information. For example, the end portion of the curve is the latest point in time series among the time series data of the point cloud constituting the curve obtained by the user's operation.

The display processing unit 2634 generates display information for displaying the character string to be displayed on the display 28 along the curve indicated by the curve information, and displays the character string on the display 28 in accordance with the generated display information. The display information generated by the display processing unit 2634 is, for example, information for superimposing and displaying the character string acquired by the character string acquiring unit 262 on the curve image included in the curve information acquired by the curve information acquiring unit 261.

Moreover, in a case where the comparison result output from the length comparison unit 2631 indicates that the length of the curve is shorter than the length of the character string, the display processing unit 2634 generates display information for displaying, on the display 28 along the extended portion added to the curve by the curve extension unit 2633, a part of the character string that cannot be superimposed and displayed on the curve image. The display processing unit 2634 displays the part of the character string on the display 28 in accordance with the generated display information. Furthermore, after displaying the character string on the display 28, the display processing unit 2634 generates display information for deleting the curve image and deletes the curve image from the display region of the display 28 in accordance with the generated display information.

The display processing unit 2634 accepts selection of a character string partially disposed in the first virtual region or the second virtual region. For example, in a case where a contact time of the user, that is, a touch panel touching time of the user on a character displayed in the display region of the display 28 among characters included in a character string partially disposed in the first virtual region or the second virtual region is longer than a threshold, the display processing unit 2634 accepts selection of the character string. The threshold may be stored in the internal memory of the display processing unit 2634 or may be given from the outside.

The display processing unit 2634 adds, to the outline of the character included in the character string, an edge of a color different from that of the character, the selection of the character string being accepted. Then, the display processing unit 2634 accepts movement of the character string, the selection of the character string being accepted. For example, when movement for disposing the entire selected character string in the display region of the display 28 is accepted, the display processing unit 2634 generates display information for displaying the entire character string in the display region of the display 28. Moreover, when movement for moving the entire selected character string to a region outside the display region of the display 28 is accepted, the display processing unit 2634 discards the character string.

The virtual region setting unit 2635 sets the first virtual region around the display region of the display 28 and sets the aspect ratio adjusting display region of the display region of the display 28 as the second virtual region. For example, in a case where the aspect ratio of the display 28 is adjusted to the aspect ratio received from the terminal 2 of the communication partner by the communication unit 29, the virtual region setting unit 2635 changes the vertical dimension or the horizontal dimension of the display region so that the area of the display region after the aspect ratio is changed becomes the largest.

In a case where the vertical dimension of the display region of the display 28 is reduced in order to change the aspect ratio of the display 28, the position of the aspect ratio adjusting display region is decided to be the position of each end in the vertical direction or the position of one end in the vertical direction of the display region. The size of the aspect ratio adjusting display region is the size of the remaining region obtained by excluding the display region with a reduced vertical dimension from the original display region. Moreover, in a case where the horizontal dimension of the display region of the display 28 is reduced, the position of the aspect ratio adjusting display region is decided to be the position of each end in the horizontal direction or the position of one end in the horizontal direction of the display region. The size of the aspect ratio adjusting display region is the size of the remaining region obtained by excluding the display region with a reduced horizontal dimension from the original display region. The virtual region setting unit 2635 decides the position and size of the aspect ratio adjusting display region in the display region of the display 28, and sets the aspect ratio adjusting display region whose position and size have been decided as the second virtual region.

The virtual region setting unit 2635 outputs information indicating the first virtual region set around the display region of the display 28 and information indicating the second virtual region in the display region of the display 28 to the display processing unit 2634. For example, the virtual region setting unit 2635 may set the second virtual region by changing the aspect ratio of the display 28 to a preset aspect ratio.

Furthermore, the virtual region setting unit 2635 may set the second virtual region by matching the aspect ratio to the new aspect ratio calculated from the aspect ratio of the display 28 and the aspect ratio of the communication partner.

Moreover, in a case where the host terminal 2 and the guest terminal 2 are set between the terminals 2, the virtual region setting unit 2635 may set the second virtual region by adjusting the display 28 of the guest terminal 2 to the aspect ratio of the host terminal 2.

Figure 5:
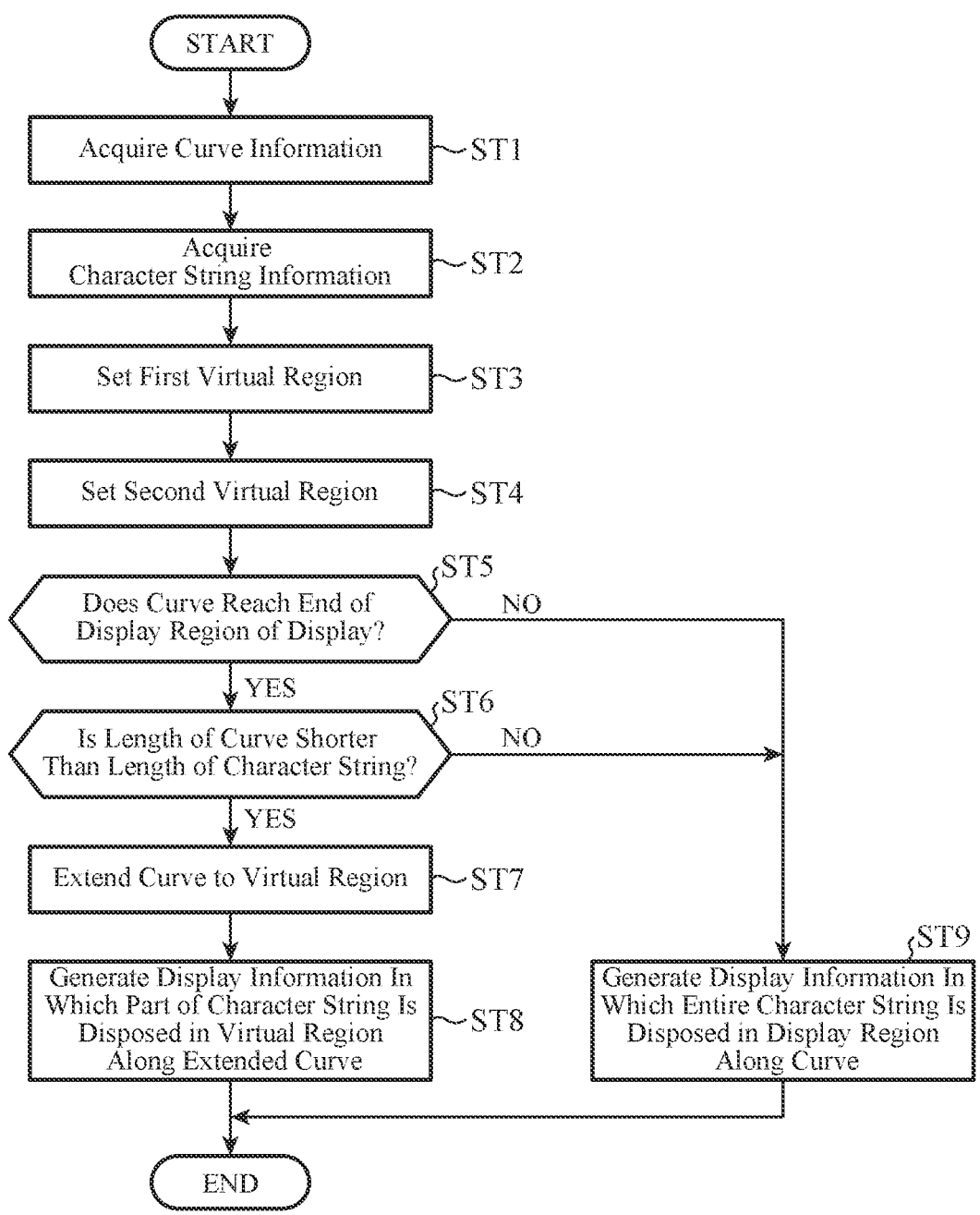
FIG. 5 is a flowchart illustrating an input display control method according to the first embodiment.

FIG. 5 is a flowchart illustrating an input display control method according to the first embodiment, and illustrates the operation of the input display control device 26. The curve information acquiring unit 261 acquires the curve information output from the path determination unit 24 (step ST1). The curve information acquiring unit 261 outputs the acquired curve information to the length comparison unit 2631, the shape decision unit 2632 and the curve extension unit 2633. The character string acquiring unit 262 acquires character string information output from the character string recognizing unit 25 (Step ST2). The character string acquiring unit 262 outputs the acquired character string information to the length comparison unit 2631 and display processing unit 2634.

The virtual region setting unit 2635 sets a region around the display region of the display 28 as the first virtual region (Step ST3). For example, the virtual region setting unit 2635 assumes that the two-dimensional coordinate system in the display region (screen) of the display 28 is extended to a plane outside the display region, and sets a region outside the display region as the first virtual region. The virtual region setting unit 2635 sets, as the second virtual region, a region which is in the display region (screen) of the display 28 and in which display information shared with the terminal 2 of the communication partner is not displayed in order to match the aspect ratio with that of the terminal 2 of the communication partner (Step ST4).

The display processing unit 2634 determines whether or not the curve reaches the end of the display region of the display 28 (Step ST5). For example, the display processing unit 2634 determines whether or not the curve reaches the end of the display region of the display 28 on the basis of whether or not the end portion of the curve indicated by the curve information exists on the boundary between the display region of the display 28 and the first virtual region or whether or not the end portion of the curve indicated by the curve information exists on the boundary between the display region of the display 28 and the second virtual region.

In a case where it is determined that the curve reaches the end of the display region of the display 28 (Step ST5; YES), the length comparison unit 2631 determines whether or not the length of the curve indicated by the curve information is shorter than the length of the character string (Step ST6). For example, the length comparison unit 2631 calculates the length of the curve indicated by the curve information, and compares the calculated length of the curve with the length of the character string. The length comparison unit 2631 determines whether or not the length of the curve is shorter than the length of the character string on the basis of a result of comparing the calculated length of the curve with the length of the character string.

Subsequently, in a case where the length of the curve is shorter than the length of the character string (Step ST6; YES), the curve extension unit 2633 extends the curve by adding the extended portion, whose shape has been decided by the shape decision unit 2632, to the end of the curve indicated by the curve information (Step ST7).

The display processing unit 2634 generates display information in which a part of the character string is virtually disposed in any one of the first virtual region, the second virtual region, and the first virtual region straddling the second virtual region along the curve extended by the curve extension unit 2633 (Step ST8).

Moreover, in a case where the curve does not reach the end of the display region of the display 28 (Step ST5; NO), or in a case where the length of the curve is greater than or equal to the length of the character string (Step ST6; NO), the display processing unit 2634 generates display information in which the entire character string is disposed in the display region along the curve indicated by the curve information (Step ST9).

Figure 6:
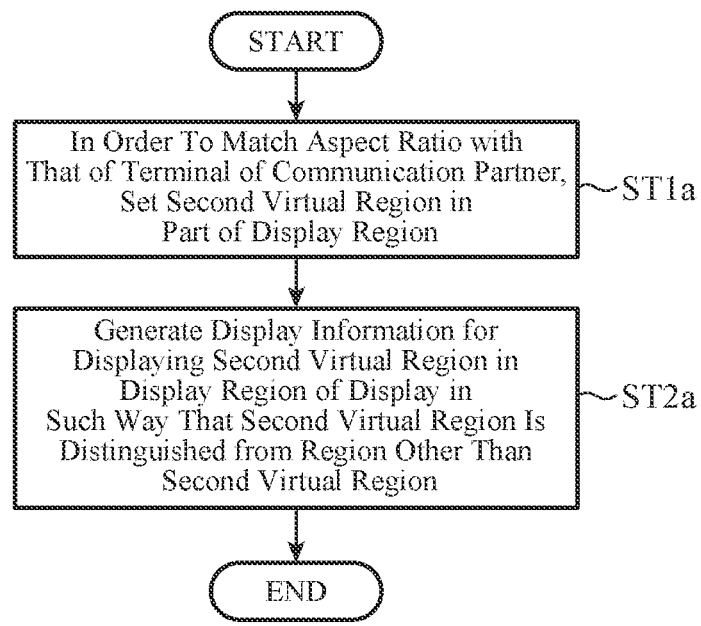
FIG. 6 is a flowchart illustrating a method of setting a second virtual region in the first embodiment.

FIG. 6 is a flowchart illustrating a method of setting the second virtual region, and illustrates operations of the virtual region setting unit 2635 and the display processing unit 2634. The virtual region setting unit 2635 sets a part of the display region as the second virtual region in order to match the aspect ratio with that of the terminal 2 of the communication partner (Step ST1*a*). For example, the virtual region setting unit 2635 decides the position and size of the aspect ratio adjusting display region in the display region of the display 28 in order to match the aspect ratio with that of the terminal 2 of the communication partner, and sets the aspect ratio adjusting display region whose position and size have been decided as the second virtual region.

FIG. 7A is a screen view illustrating a screen example in a case where the terminal 2 is a smartphone. In the terminal 2 illustrated in FIG. 7A, the aspect ratio of the screen 28A is 16:9. FIG. 7B is a screen view illustrating a screen example in a case where the terminal 2 is a tablet terminal. In the terminal 2 illustrated in FIG. 7B, the aspect ratio of the screen 28B is 4:3. In FIGS. 7A and 7B, each of the screens 28A and 28B is a display region DA. The virtual region setting unit 2635 sets a region around the display region DA as a first virtual region VA1.

FIG. 7C is a screen view illustrating a screen example when the aspect ratio of the screen of the smartphone is set to 4:3. The virtual region setting unit 2635 sets a second virtual region VA2 in the display region DA illustrated in FIG. 7A in order to match the aspect ratio (16:9) of the screen 28A to the aspect ratio (4:3) of the screen 28B. Consequently, the second virtual region VA2 and a display region DA1 are set in the display region DA.

FIG. 7D is a screen view illustrating a screen example when the aspect ratio of the screen of the tablet terminal is set to 16:9. The virtual region setting unit 2635 sets a second virtual region VA2 in the display region DA illustrated in FIG. 7B in order to match the aspect ratio (4:3) of the screen 28B to the aspect ratio (16:9) of the screen 28A. Consequently, the second virtual region VA2 and a display region DA1 are set in the display region DA.

Figure 8B:
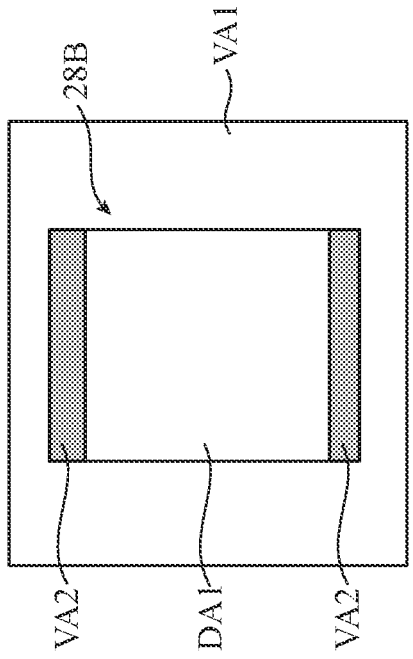
FIGS. 8A to 8D are screen views illustrating display examples of the second virtual region.
Figure 8D:
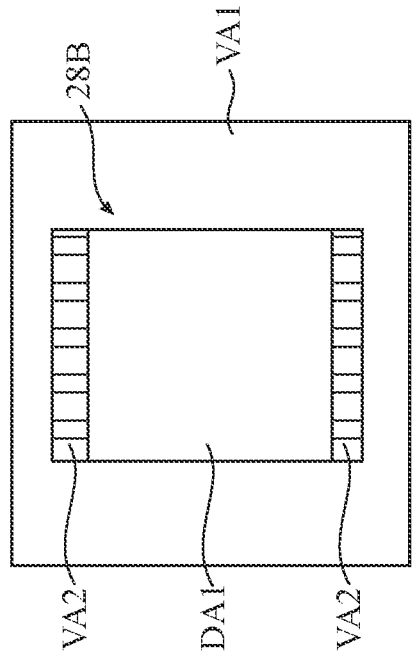
Figure 8A:
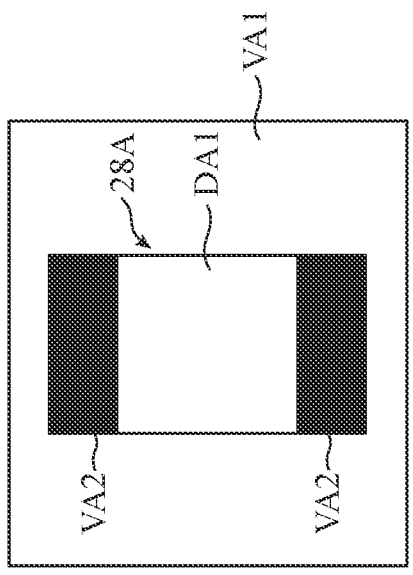

Next, the display processing unit 2634 generates display information for displaying the second virtual region in the display region of the display 28 in such a way that the second virtual region is distinguished from a region other than the second virtual region (Step ST2a). FIGS. 8A to 8D are screen views illustrating display examples of the second virtual region. For example, the display processing unit 2634 generates display information for superimposing and displaying a black belt image on the second virtual region VA2. As illustrated in FIG. 8A, the display 28 displays the black belt image in the second virtual region VA2 in accordance with the generated display information. Thus, the user can grasp that display information is displayed only in the region DA1 in the display region DA of the display 28.

When an operation of enlarging, reducing, or scrolling the screen of the display 28 is accepted by the operation acceptance unit 21, the display processing unit 2634 generates display information for enlarging, reducing, or scrolling only the display region DA1 in accordance with the operation, with the second virtual region VA2 as it is. The display 28 enlarges, reduces, or scrolls the display region DA1 in accordance with the generated display information.

For example, the display processing unit 2634 generates display information for superimposing and displaying a gray image on the second virtual region VA2. In accordance with the display information generated by the display processing unit 2634, the display 28 displays the gray image superimposed on the second virtual region VA2 as illustrated in FIG. 8B. Moreover, for example, the display processing unit 2634 generates display information for superimposing and displaying a gray image on the second virtual region VA2. In accordance with the generated display information, the display 28 displays the gray image superimposed on the second virtual region VA2 as illustrated in FIG. 8B. Thus, the user can grasp that display information is displayed only in the region DA1 in the display region DA of the display 28.

Figure 8C:
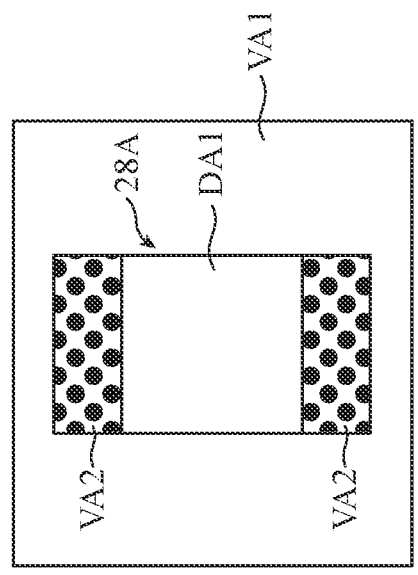

Furthermore, the display processing unit 2634 generates display information for superimposing and displaying a dot pattern image on the second virtual region VA2. In accordance with the display information generated by the display processing unit 2634, the display 28 displays the dot pattern image superimposed on the second virtual region VA2 as illustrated in FIG. 8C. For example, the display processing unit 2634 generates display information for superimposing and displaying a dot pattern image on the second virtual region VA2. In accordance with the generated display information, the display 28 displays the dot pattern image superimposed on the second virtual region VA2 as illustrated in FIG. 8C. Thus, the user can grasp that display information is displayed only in the region DA1 in the display region DA of the display 28.

For example, the display processing unit 2634 generates display information for superimposing and displaying a stripe image on the second virtual region VA2. In accordance with the display information generated by the display processing unit 2634, the display 28 displays the stripe image superimposed on the second virtual region VA2 as illustrated in FIG. 8D. For example, the display processing unit 2634 generates display information for superimposing and displaying a stripe image on the second virtual region VA2. In accordance with the generated display information, the display 28 displays the stripe image superimposed on the second virtual region VA2 as illustrated in FIG. 8D. Thus, the user can grasp that display information is displayed only in the region DA1 in the display region DA of the display 28.

Figure 9A:
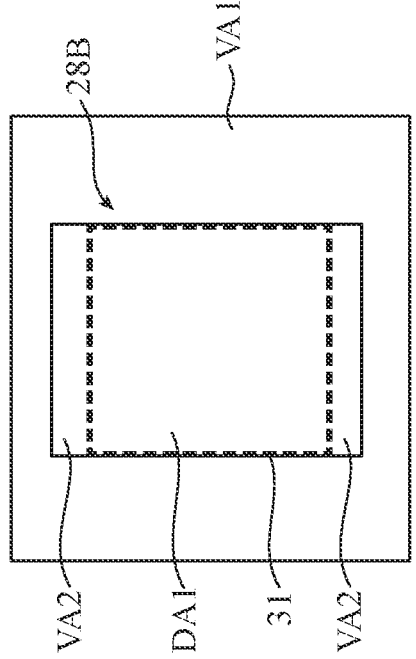
FIG. 9A is a screen view illustrating a screen in which a display region and the second virtual region of a display are distinguished by a black line frame.

FIG. 9A is a screen view illustrating a screen in which the display region DA1 and the second virtual region VA2 of the display 28 are distinguished from each other by a black line frame 30. The display processing unit 2634 generates display information for displaying the display region DA1 surrounded by the black line frame 30, for example. In accordance with the display information generated by the display processing unit 2634, the display 28 displays the display region DA1 surrounded by the black line frame 30 as illustrated in FIG. 9A. The second virtual region VA2 is distinguished from the display region DA1 by the black line frame 30. Thus, the user can grasp that display information is displayed only in the region DA1 in the display region DA of the display 28.

Figure 9B:
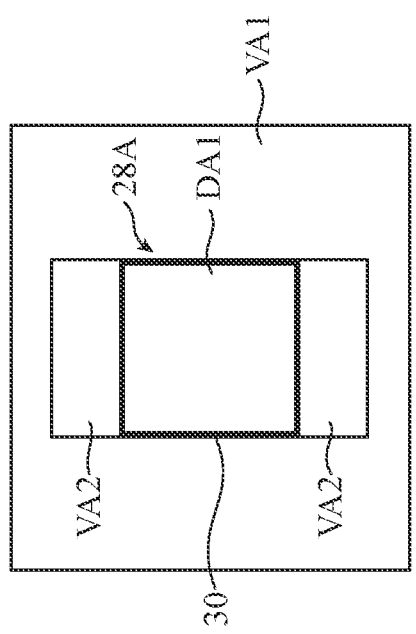
FIG. 9B is a screen example illustrating a screen in which the display region and the second virtual region of the display are distinguished by a broken line frame.

FIG. 9B is a screen example illustrating a screen in which the display region DA1 and the second virtual region VA2 of the display 28 are distinguished from each other by a broken line frame 31. The display processing unit 2634 generates display information for displaying the display region DA1 surrounded by the broken line frame 31, for example. In accordance with the display information generated by the display processing unit 2634, the display 28 displays the display region DA1 surrounded by the broken line frame 31 as illustrated in FIG. 9B. The second virtual region VA2 is distinguished from the display region DA1 by the broken line frame 31. Thus, the user can grasp that display information is displayed only in the region DA1 in the display region DA of the display 28.

Figure 10:
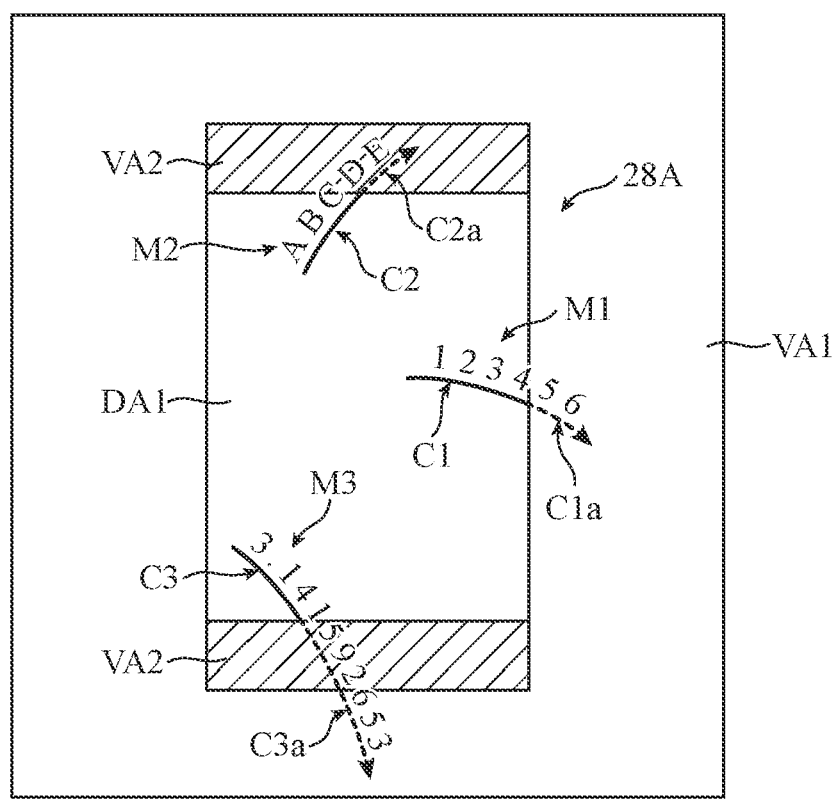
FIG. 10 is a screen example illustrating an example in which a part of a character string cannot be displayed in a display region of a display.

FIG. 10 is a screen example illustrating an example in which a part of a character string cannot be displayed in the display region DA1 of the display 28. When the user slides the finger on the touch surface provided on the screen of the display 28 in the right direction in FIG. 10, the right end of the curve C1 indicated by the curve information is positioned at the right end of the display region DA1 of the display 28. However, when the length of the character string M1 to be displayed in the display region DA1 along the curve C1 is compared with the length of the curve C1, the length of the curve C1 is shorter than the length of the character string M1. For this reason, a part of "4" and "5"

and "6" in "123456" which is the character string M1 protrude from the display region DA1 and are not displayed.

In a case where a part of the character string M1 cannot be displayed in the display region DA1, the display processing unit 2634 adds an extension curve C1a to the curve C1 to extend the curve C1 to the first virtual region VA1, and generates display information in which an undisplayed character string "456" is virtually disposed in the first virtual region VA1 along the extension curve C1a. By utilizing this display information, the display 28 can display the entire character string M1 including the undisplayed character string "456" in the display region DA1.

Moreover, in FIG. 10, when the user slides the finger on the touch surface provided on the screen of the display 28 in the upward direction in FIG. 10, the right end of the curve C2 indicated by the curve information is positioned at the upper end of the display region DA1 of the display 28. However, when the length of the character string M2 to be displayed in the display region DA1 along the curve C2 is compared with the length of the curve C2, the length of the curve C2 is shorter than the length of the character string M2. Therefore, a part of "C" and "D" and "E" in "ABCDE" which is the character string M2 protrude from the display region DA1 and are not displayed.

In a case where a part of the character string M2 cannot be displayed in the display region DA1, the display processing unit 2634 adds an extension curve C2a to the curve C2 to extend the curve C2 to the second virtual region VA2, and generates display information in which an undisplayed character string "CDE" is virtually disposed in the second virtual region VA2 along the extension curve C2a. By utilizing this display information, the display 28 can display the entire character string M2 including the undisplayed character string "CDE" in the display region DA1.

In FIG. 10, when the user slides the finger on the touch surface provided on the screen of the display 28 in the downward direction in FIG. 10, the right end of the curve C3 indicated by the curve information is positioned at the lower end of the display region DA1 of the display 28. However, when the length of the character string M3 to be displayed in the display region DA1 along the curve C3 is compared with the length of the curve C3, the length of the curve C3 is shorter than the length of the character string M3. Therefore, "592653" in "3.141592653" which is the character string M3 protrudes from the display region DA1 and is not displayed.

In a case where a part of the character string M3 cannot be displayed in the display region DA1, the display processing unit 2634 adds an extension curve C3a to the curve C3 to extend the curve C3 to the first virtual region VA1 straddling the second virtual region VA2, and generates display information in which an undisplayed character string "592653" is virtually disposed in the second virtual region VA2 and the first virtual region VA1 along the extension curve C3a. By utilizing this display information, the display 28 can display the entire character string M3 including the undisplayed character string "592653" in the display region DA1.

Figure 11:
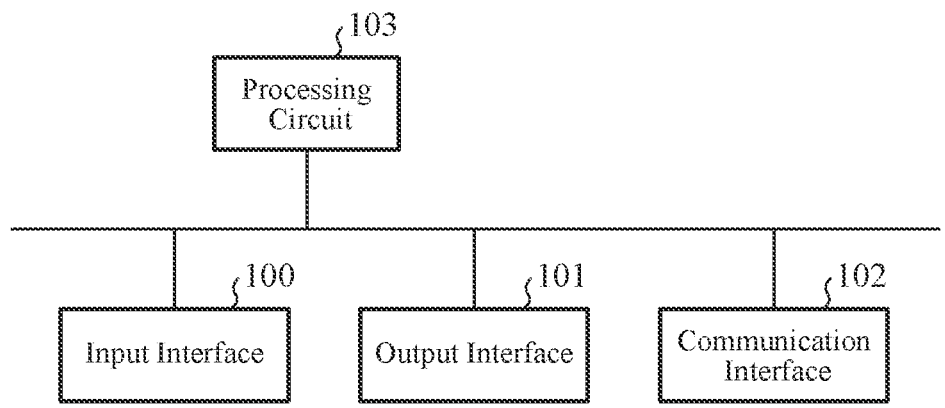
FIG. 11 is a block diagram illustrating a hardware configuration that implements functions of the input display control device according to the first embodiment.

FIG. 11 is a block diagram illustrating a hardware configuration that implements functions of the input display control device 26. In FIG. 11, a processing circuit 103 acquires data from the operation acceptance unit 21, the path determination unit 24, and the character string recognizing unit 25 via an input interface 100. The processing circuit 103 outputs the display information to the display 28 via an output interface 101. The processing circuit 103 inputs and outputs data transmitted and received to and from the terminal 2 of the communication partner by the communication unit 29 via a communication interface 102.

Figure 12:
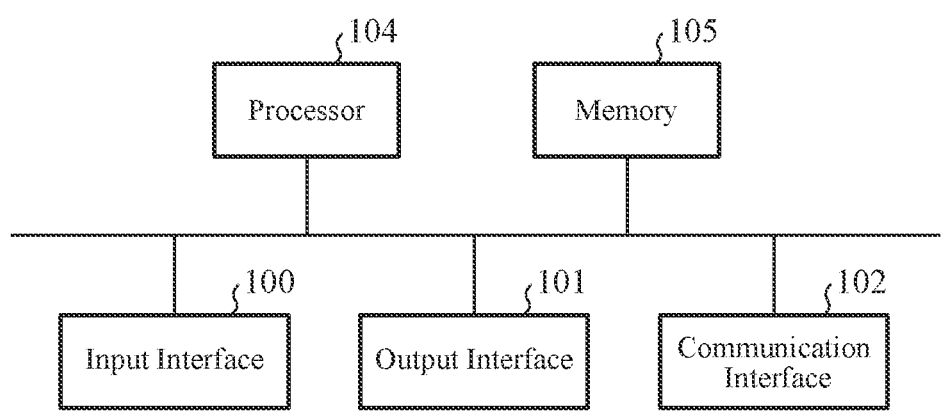
FIG. 12 is a block diagram illustrating a hardware configuration for executing software for implementing functions of the input display control device according to the first embodiment.

FIG. 12 is a block diagram illustrating a hardware configuration for executing software for implementing functions of the input display control device 26. In FIG. 12, a processor 104 acquires data from the operation acceptance unit 21, the path determination unit 24, and the character string recognizing unit 25 via the input interface 100. The processor 104 outputs the display information to the display 28 via the output interface 101. The processor 104 inputs and outputs data transmitted and received to and from the terminal 2 of the communication partner by the communication unit 29 via the communication interface 102.

The functions of the curve information acquiring unit 261, the character string acquiring unit 262, and the display control unit 263 included in the input display control device 26 are implemented by a processing circuit. That is, the input display control device 26 includes a processing circuit that executes each process from Step ST1 to Step ST9 illustrated in FIG. 5. The processing circuit may be dedicated hardware or a central processing unit (CPU) that executes a program stored in a memory.

In a case where the processing circuit is the processing circuit 103 of dedicated hardware illustrated in FIG. 11, the processing circuit 103 corresponds to, for example, a single circuit, a composite circuit, a programmed processor, a parallel programmed processor, an application specific integrated circuit (ASIC), a field-programmable gate array (FPGA), or a combination thereof. The functions of the curve information acquiring unit 261, the character string acquiring unit 262, and the display control unit 263 included in the input display control device 26 may be implemented by separate processing circuits, or these functions may be collectively implemented by one processing circuit.

In a case where the processing circuit is the processor 104 illustrated in FIG. 12, the functions of the curve information acquiring unit 261, the character string acquiring unit 262, and the display control unit 263 included in the input display control device 26 are implemented by software, firmware, or a combination of software and firmware. Note that the software or firmware is described as a program and stored in a memory 105.

The processor 104 reads out and executes the program stored in the memory 105 to implement the functions of the curve information acquiring unit 261, the character string acquiring unit 262, and the display control unit 263 included in the input display control device 26. For example, the input display control device 26 includes the memory 105 for storing a program that results in execution of the processing from Step ST1 to Step ST9 in the flowchart illustrated in FIG. 5 when executed by the processor 104. These programs cause a computer to execute procedures or methods of the curve information acquiring unit 261, the character string acquiring unit 262 and the display control unit 263. The memory 105 may be a computer-readable storage medium storing a program for causing a computer to function as the curve information acquiring unit 261, the character string acquiring unit 262 and the display control unit 263.

The memory 105 corresponds to, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, or a DVD.

A part of the functions of the curve information acquiring unit 261, the character string acquiring unit 262, and the display control unit 263 included in the input display control device 26 may be implemented by dedicated hardware, and the remaining part may be implemented by software or firmware. For example, the functions of the curve information acquiring unit 261 and the character string acquiring unit 262 are implemented by the processing circuit 103 that is dedicated hardware, and the function of the display control unit 263 is implemented by the processor 104 reading out and executing a program stored in the memory 105. As described above, the processing circuit can implement the above functions by hardware, software, firmware, or a combination thereof.

A detailed example of setting of the first virtual region VA1 and the second virtual region VA2 by the virtual region setting unit 2635 will be described.

Figure 13A:
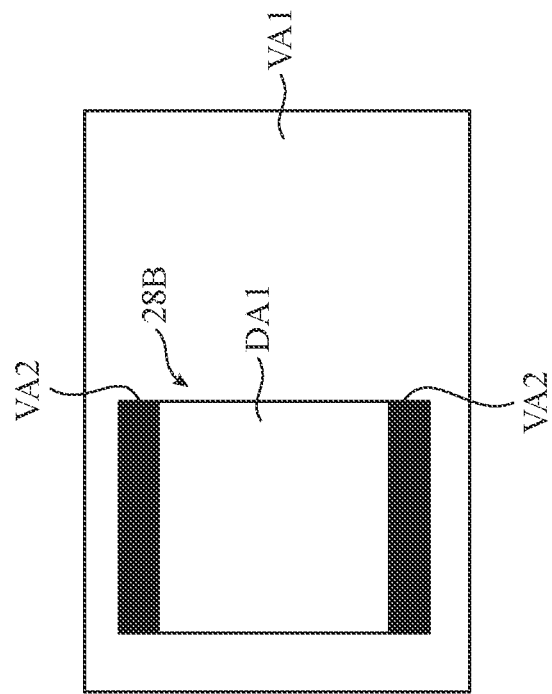
FIGS. 13A and 13B are screen views illustrating screen examples when the aspect ratios of the screens of the smartphone and the tablet terminal are set to 1:1.
Figure 13B:
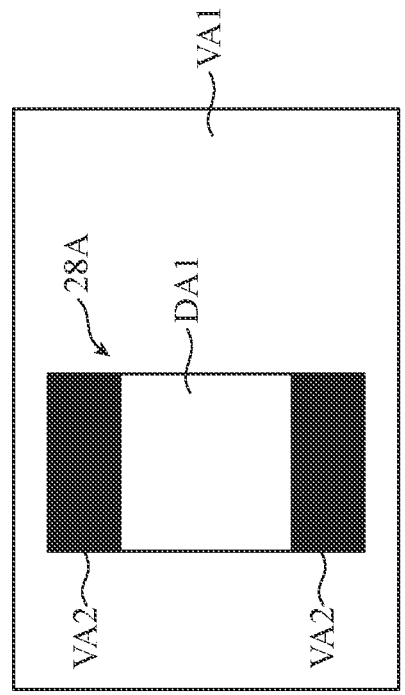

FIG. 13A is a screen view illustrating a screen example in a case where the terminal 2 is a smartphone. In the terminal 2 illustrated in FIG. 13A, the aspect ratio of the screen 28A is 16:9. FIG. 13B is a screen view illustrating a screen example in a case where the terminal 2 is a tablet terminal. In the terminal 2 illustrated in FIG. 13B, the aspect ratio of the screen 28B is 4:3. In FIGS. 13A and 13B, the virtual region setting unit 2635 matches the aspect ratio to a preset aspect ratio (1:1). For example, the virtual region setting unit 2635 mounted on the smartphone illustrated in FIG. 13A sets the second virtual region VA2 in the display region DA in order to match the aspect ratio (16:9) of the screen 28A to the preset aspect ratio (1:1). The virtual region setting unit 2635 of the tablet terminal illustrated in FIG. 13B sets the second virtual region VA2 in the display region DA in order to match the aspect ratio (4:3) of the screen 28B to the preset aspect ratio (1:1).

Figure 14A:
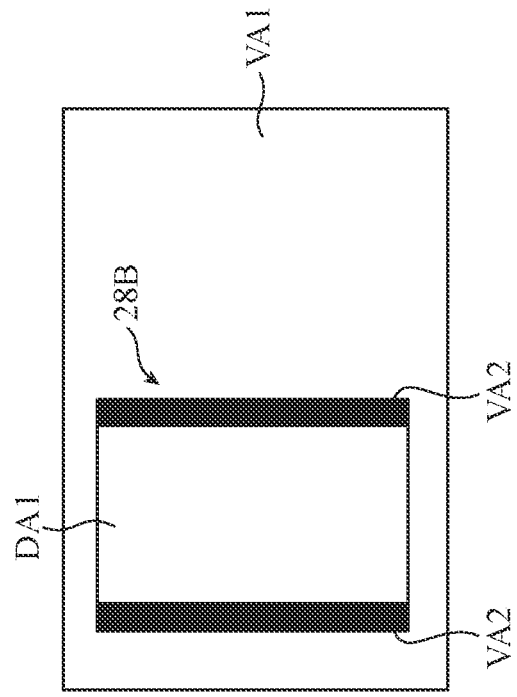
FIGS. 14A and 14B are screen views illustrating screen examples when the aspect ratios of the screens of the smartphone and the tablet terminal are set to a ratio calculated from the aspect ratios of the two.
Figure 14B:
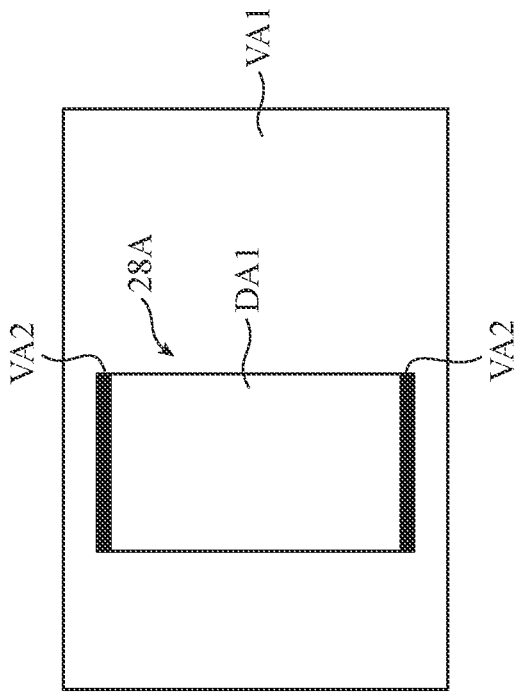

FIG. 14A is a screen view illustrating a screen example in a case where the terminal 2 is a smartphone. In the terminal 2 illustrated in FIG. 14A, the aspect ratio of the screen 28A is 16:9. FIG. 14B is a screen view illustrating a screen example in a case where the terminal 2 is a tablet terminal. The aspect ratio of the screen 28B is 4:3. The virtual region setting unit 2635 may set the second virtual region by setting a new aspect ratio calculated from the aspect ratio of the screen 28A and the aspect ratio of the screen 28B. For example, the virtual region setting unit 2635 calculates an aspect ratio in which a value obtained by adding vertical ratios in the aspect ratio of the smartphone and the aspect ratio of the tablet terminal is set as a new vertical ratio and a value obtained by adding horizontal ratios is set as a new horizontal ratio.

Since the aspect ratio of the screen 28A is 16:9 and the aspect ratio of the screen 28B is 4:3, 20 (=16+4):12 (=9+3) is calculated as a new aspect ratio. The virtual region setting unit 2635 mounted on the smartphone illustrated in FIG. 14A sets the second virtual region VA2 in the display region DA by matching the aspect ratio 16:9 of the screen 28A to the new aspect ratio 20:12. The virtual region setting unit 2635 of the tablet terminal illustrated in FIG. 14B sets the second virtual region VA2 in the display region DA by matching the aspect ratio 4:3 of the screen 28B to the new aspect ratio 20:12.

Moreover, in addition to the case where the value obtained by adding the vertical ratios in the aspect ratios is set as the vertical ratio and the value obtained by adding the horizontal ratios is set as the horizontal ratio, for example, a value obtained by multiplying the vertical ratios by each other and taking the square root may be set as the vertical ratio and a value obtained by multiplying the horizontal ratios by each other and taking the square root may be set as the horizontal ratio. Moreover, the aspect ratio may be adjusted so that the display region DA1 becomes the largest.

Figure 15A:
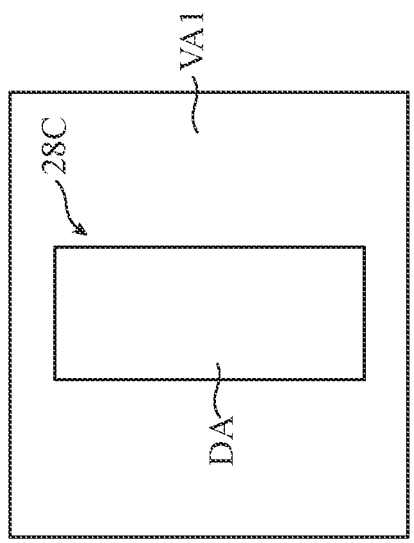
FIGS. 15A to 15C are screen views illustrating screen examples of three terminals having different aspect ratios from each other.
Figure 15B:
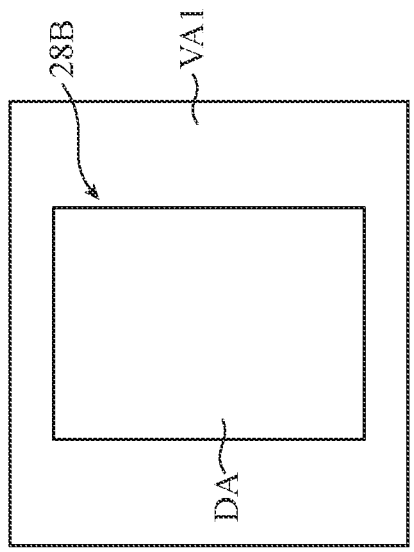
Figure 15C:
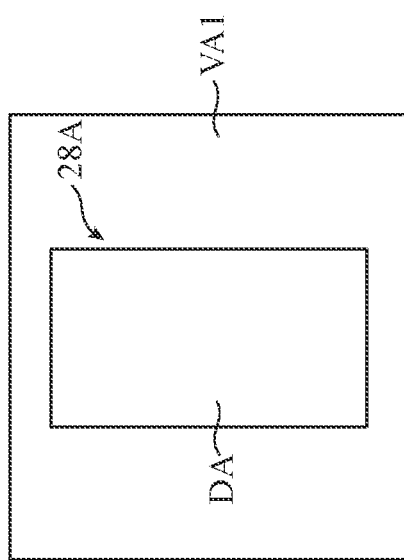

FIGS. 15A to 15C are screen views illustrating screen examples of three terminals 2 having different aspect ratios from each other. FIG. 15A is a screen view illustrating a screen example in a case where the terminal 2 is a smartphone. In the terminal 2 illustrated in FIG. 15A, the aspect ratio of the screen 28A is 16:9. FIG. 15B is a screen view illustrating a screen example in a case where the terminal 2 is a tablet terminal. In the terminal 2 illustrated in FIG. 15B, the aspect ratio of the screen 28B is 4:3. FIG. 15C is a screen view illustrating a screen example in a case where the terminal 2 is a smartphone. In the terminal 2 illustrated in FIG. 15C, the aspect ratio of the screen 28C is 7:3. In FIGS. 15A, 15B and 15C, the screens 28A, 28B and 28C are display regions DA. The virtual region setting unit 2635 sets a region around the display region DA as the first virtual region VA1.

Figure 16A:
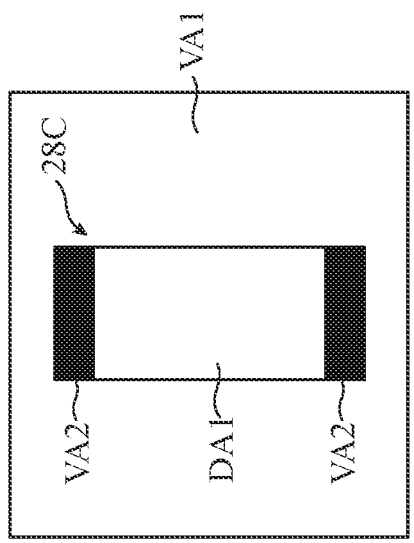
FIGS. 16A to 16C are screen views illustrating screen examples when the aspect ratio of each of the screens of the three terminals is set to 16:9.
Figure 16B:
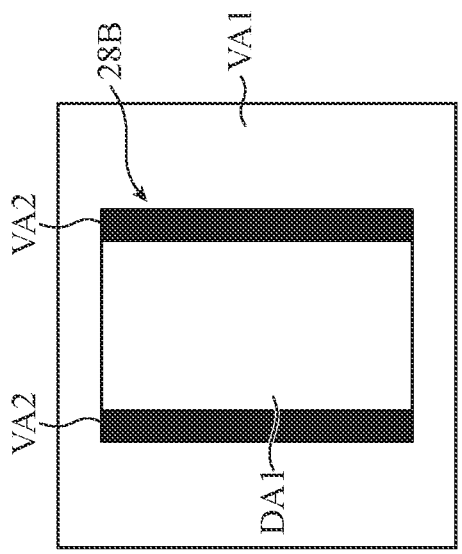
Figure 16C:
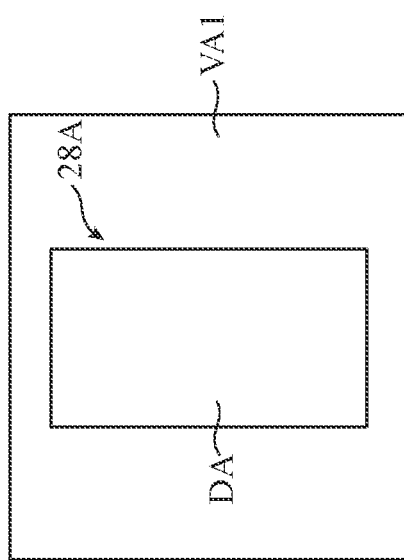

FIGS. 16A to 16C are screen views illustrating screen examples when the aspect ratio of each of the screens of the three terminals 2 is set to 16:9. The communication unit 29 included in the smartphone illustrated in FIG. 16A transmits information indicating the aspect ratio (16:9) of the screen 28A to the tablet terminal illustrated in FIG. 16B and the smartphone illustrated in FIG. 16C. The virtual region setting unit 2635 mounted on the tablet terminal illustrated in FIG. 16B sets the second virtual region VA2 in the display region DA illustrated in FIG. 15B in order to match the aspect ratio 4:3 of the screen 28B to the aspect ratio (16:9) of the screen 28A. Similarly, the virtual region setting unit 2635 mounted on the smartphone illustrated in FIG. 16C sets the second virtual region VA2 in the display region DA illustrated in FIG. 15C in order to match the aspect ratio 7:3 of the screen 28C to the aspect ratio (16:9) of the screen 28A. Consequently, the second virtual region VA2 and the display region DA1 are set in the display region DA.

Figure 17A:
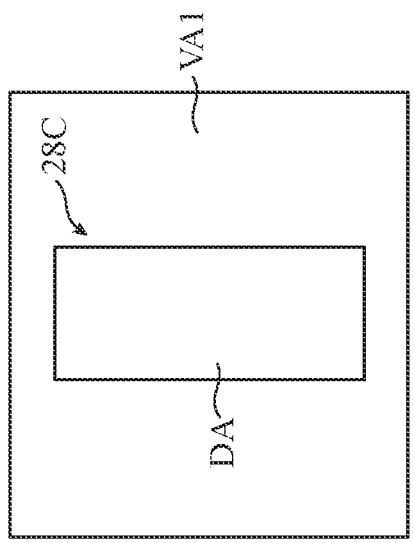
FIGS. 17A to 17C are screen views illustrating screen examples when the aspect ratio of each of the screens of the three terminals is set to 7:3.
Figure 17B:
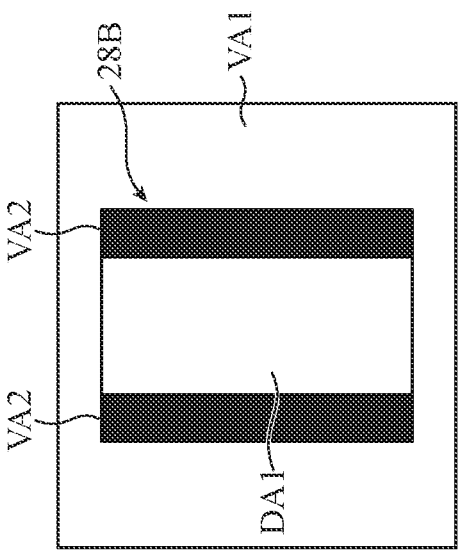
Figure 17C:
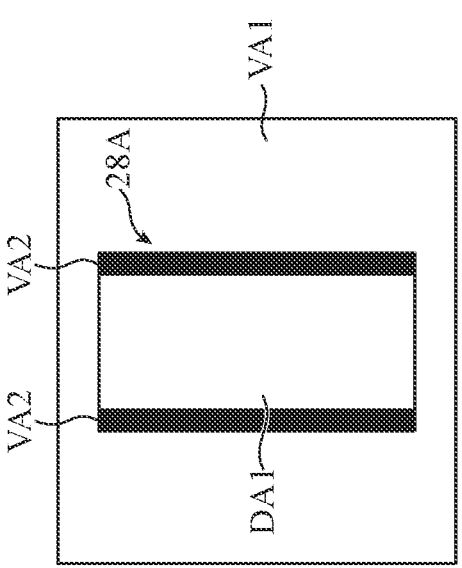

FIGS. 17A to 17C are screen views illustrating screen examples when the aspect ratio of each of the screens of the three terminals 2 is set to 7:3. The communication unit 29 included in the smartphone illustrated in FIG. 17C transmits information indicating the aspect ratio (7:3) of the screen 28C to the smartphone illustrated in FIG. 17A and the tablet terminal illustrated in FIG. 17B. The virtual region setting unit 2635 mounted on the smartphone illustrated in FIG. 17A sets the second virtual region VA2 in the display region DA illustrated in FIG. 15A in order to match the aspect ratio 16:9 of the screen 28A to the aspect ratio (7:3) of the screen 28C. Similarly, the virtual region setting unit 2635 mounted on the tablet terminal illustrated in FIG. 17B sets the second virtual region VA2 in the display region DA illustrated in FIG. 15B in order to match the aspect ratio 4:3 of the screen 28B to the aspect ratio (7:3) of the screen 28C. Consequently, the second virtual region VA2 and the display region DA1 are set in the display region DA.

FIGS. 18A to 18C are screen views illustrating screen examples when the aspect ratio of each of the screens of the three terminals 2 is set to 4:3. The communication unit 29 included in the tablet terminal illustrated in FIG. 18B transmits information indicating the aspect ratio (4:3) of the screen 28B to the smartphone illustrated in FIG. 18A and the smartphone illustrated in FIG. 18C. The virtual region setting unit 2635 mounted on the smartphone illustrated in FIG. 18A sets the second virtual region VA2 in the display region DA illustrated in FIG. 15A in order to match the aspect ratio 16:9 of the screen 28A to the aspect ratio (4:3) of the screen 28B. Similarly, the virtual region setting unit 2635 mounted on the smartphone illustrated in FIG. 18C sets the second virtual region VA2 in the display region DA illustrated in FIG. 15C in order to match the aspect ratio 7:3 of the screen 28C to the aspect ratio (4:3) of the screen 28B. Consequently, the second virtual region VA2 and the display region DA1 are set in the display region DA.

FIGS. 19A to 19C are screen views illustrating screen examples when the aspect ratio of each of the screens of the three terminals 2 is set to 1:1. The virtual region setting unit 2635 matches the aspect ratio to a preset aspect ratio (1:1). For example, the virtual region setting unit 2635 mounted on the smartphone illustrated in FIG. 19A sets the second virtual region VA2 in the display region DA in order to match the aspect ratio (16:9) of the screen 28A to the preset aspect ratio (1:1). The virtual region setting unit 2635 of the tablet terminal illustrated in FIG. 19B sets the second virtual region VA2 in the display region DA in order to match the aspect ratio (4:3) of the screen 28B to the preset aspect ratio (1:1). Similarly, the virtual region setting unit 2635 mounted on the smartphone illustrated in FIG. 19C sets the second virtual region VA2 in the display region DA in order to match the aspect ratio (7:3) of the screen 28C to the preset aspect ratio (1:1).

FIGS. 20A to 20C are screen views illustrating screen examples when the aspect ratio of each of the screens of the three terminals 2 is set to a ratio calculated from the aspect ratios of the three terminals. The virtual region setting unit 2635 may set the second virtual region by setting a new aspect ratio calculated from the aspect ratio of the screen 28A, the aspect ratio of the screen 28B and the aspect ratio of the screen 28C. For example, the virtual region setting unit 2635 calculates an aspect ratio in which a value obtained by adding vertical ratios in the aspect ratio of the screen 28A, the aspect ratio of the screen 28B, and the aspect ratio of the screen 28C is set as a new vertical ratio, and a value obtained by adding horizontal ratios is set as a new horizontal ratio.

Since the aspect ratio of the screen 28A is 16:9, the aspect ratio of the screen 28B is 4:3, and the aspect ratio of the screen 28C is 7:3, 27 (=16+4+7):15 (=9+3+3) is calculated as a new aspect ratio. The virtual region setting unit 2635 mounted on the smartphone illustrated in FIG. 20A sets the second virtual region VA2 in the display region DA in order to match the aspect ratio 16:9 of the screen 28A to the new aspect ratio 27:15. The virtual region setting unit 2635 of the tablet terminal illustrated in FIG. 20B sets the second virtual region VA2 in the display region DA in order to match the aspect ratio 4:3 of the screen 28B to the new aspect ratio 27:15. The virtual region setting unit 2635 mounted on the smartphone illustrated in FIG. 20C sets the second virtual region VA2 in the display region DA in order to match the aspect ratio 7:3 of the screen 28C to the new aspect ratio 27:15.

Moreover, also in FIGS. 20A, 20B and 20C, in addition to the case where the value obtained by adding the vertical ratios in the aspect ratios is set as the vertical ratio and the value obtained by adding the horizontal ratios is set as the horizontal ratio, for example, a value obtained by multiplying the vertical ratios by each other and taking the square root may be set as the vertical ratio and a value obtained by multiplying the horizontal ratios by each other and taking the square root may be set as the horizontal ratio. Moreover, the aspect ratio may be adjusted so that the display region DA1 becomes the largest.

As described above, in the input display control device 26 according to the first embodiment, the display control unit 263 sets the first virtual region VA1 around the display region DA of the display 28, and sets, as the second virtual region VA2, a region which is a part of the display region DA of the display 28 and which does not display the display information shared with the terminal 2 of the communication partner in order to match the aspect ratio with that of the terminal 2 of the communication partner. Then, in a case where it is determined that a part of the character string protrudes from the display region DA1 because the length of the curve reaching the end of the display region DA1 of the display 28 is shorter than the length of the character string, the display control unit 263 extends the curve to any one of the first virtual region VA1, the second virtual region VA2, and the first virtual region VA1 straddling the second virtual region VA2, and generates display information in which the part of the character string is virtually disposed along the extended curve in any one of the first virtual region VA1, the second virtual region VA2, and the first virtual region VA1 straddling the second virtual region VA2. Thus, even in a case where a part of a character string to be displayed protrudes into the aspect ratio adjusting display region, the input display control device 26 can generate display information for displaying the entire character string to be displayed.

In the input display control device 26 according to the first embodiment, the display control unit 263 causes the second virtual region VA2 to be displayed in the display region of the display 28 in such a way that the second virtual region VA2 is distinguished from the region DA1 other than the second virtual region VA2. Thus, the user can grasp that the display information shared with the terminal 2 of the communication partner is displayed only in the region DA1 in the display region DA of the display 28.

Second Embodiment

In an input display system according to a second embodiment, the display control unit generates display information for displaying, in the display region, the entire character string partially disposed in the virtual region. Since the input display system and an input display control device according to the second embodiment have the same configurations as those of the input display system 1 and the input display control device 26 described in the first embodiment, the description of the components is made with reference to FIGS. 2 and 4.

Figure 21:
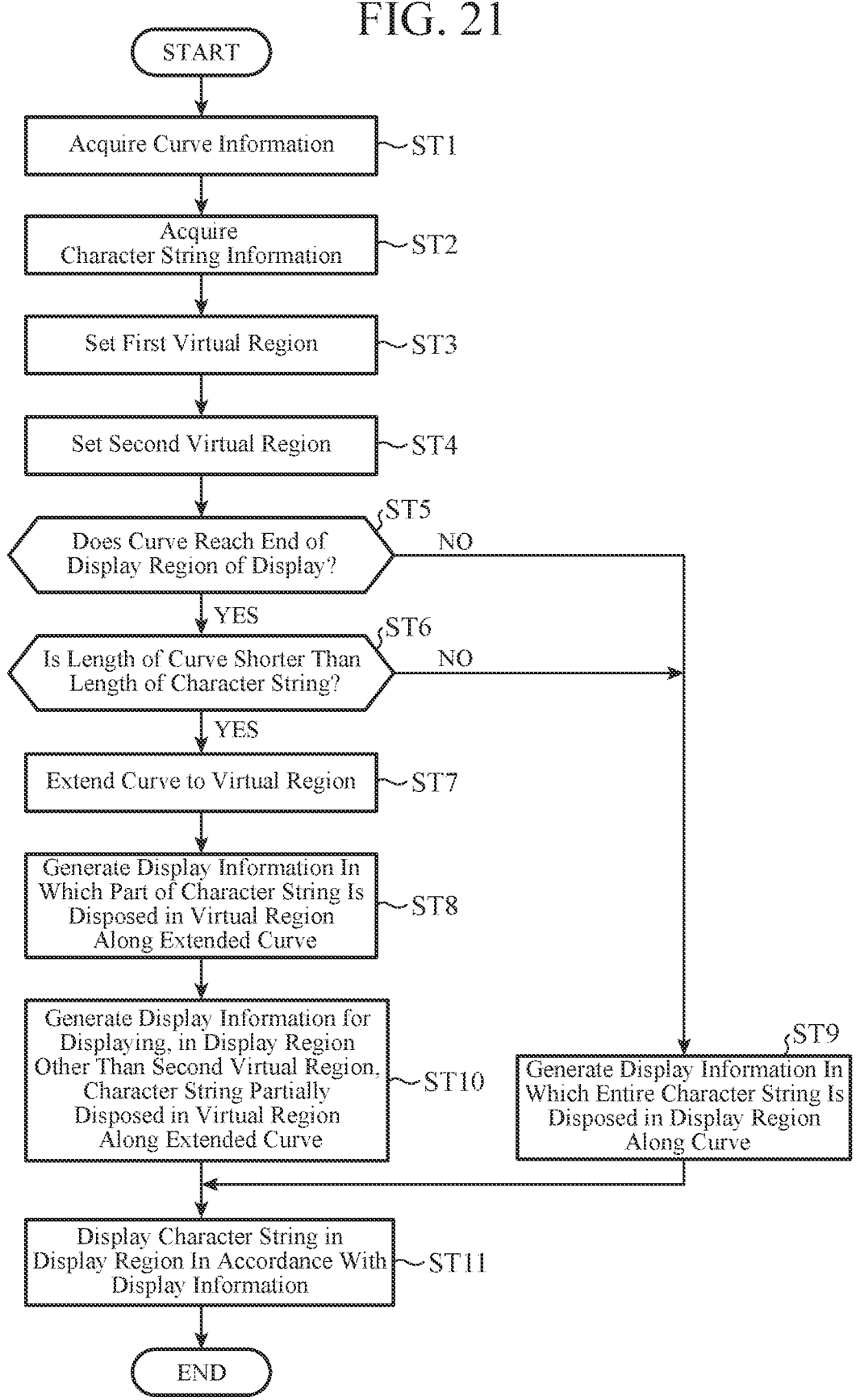
FIG. 21 is a flowchart illustrating an input display control method according to a second embodiment.

FIG. 21 is a flowchart illustrating an input display control method according to the second embodiment. In FIG. 21, since processing from Step ST1 to Step ST9 is similar to that in FIG. 5, description thereof is omitted. The display processing unit 2634 generates display information for displaying, in the display region DA1, a character string partially disposed in the virtual region along the extended curve (Step ST10). The display processing unit 2634 outputs the generated display information to the display 28. The display 28 displays the entire character string in the display region DA1 in accordance with the display information generated by the display processing unit 2634 (Step ST11).

Figure 22:
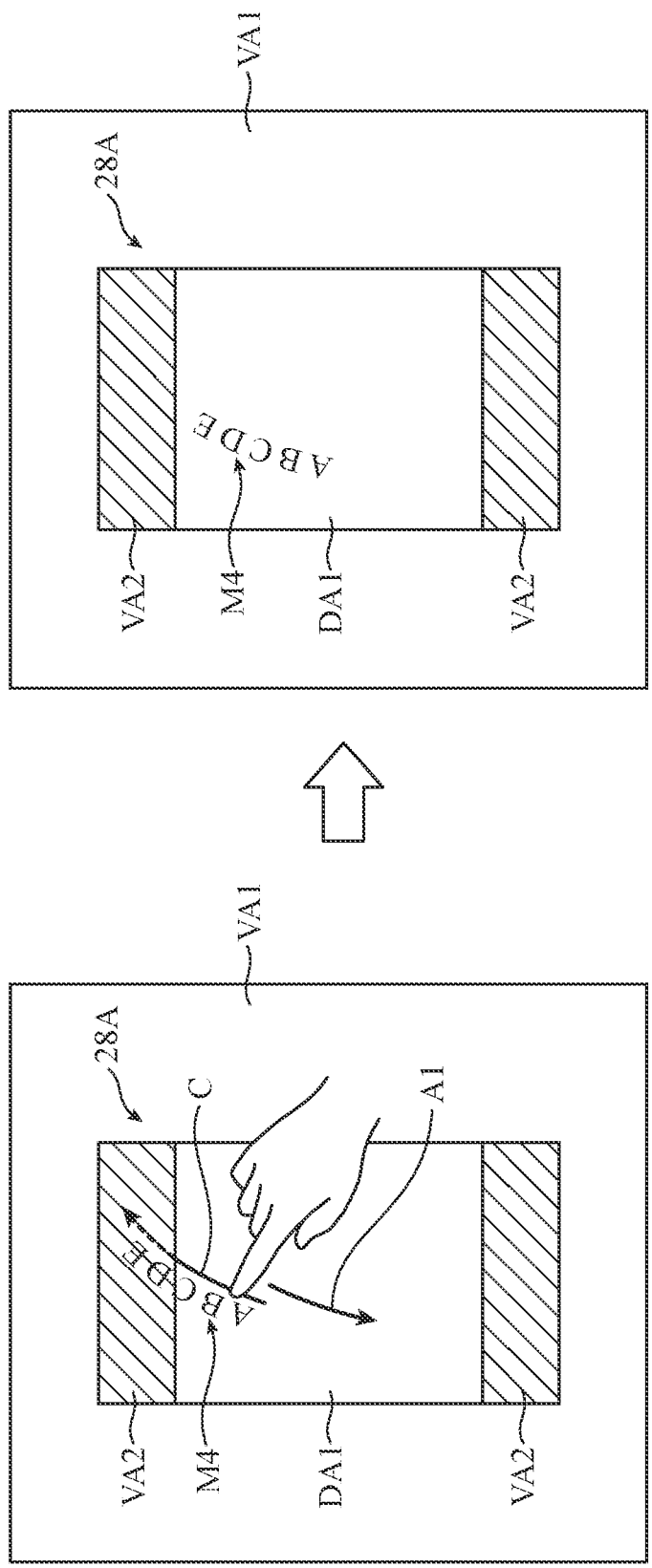
FIG. 22 is an explanatory diagram illustrating a screen example when a character string partially disposed in a virtual region is moved and thereby the entire character string is displayed in a display region of a display.

FIG. 22 is an explanatory diagram illustrating a screen example when the character string M4 partially disposed in the second virtual region VA2 is moved and thereby the entire character string M4 is displayed in the display region DA1 of the display 28. In FIG. 22, since the character string M4 is longer than the curve C reaching the upper end of the display region DA1, a part of the character string M4 protrudes into the second virtual region VA2 when the character string M4 is disposed along the curve C. Therefore, the display control unit 263 extends the curve C to the second virtual region VA2, and generates display information in which the part of the character string M4 is disposed in the second virtual region VA2 along the extended curve C.

In a case where the operation acceptance unit 21 accepts an operation of moving the character string M4 in the A1 direction, the display control unit 263 generates, by using the display information, display information for displaying the entire character string M4 in the display region DA1. The display 28 displays the entire character string M4 in the display region DA1 as illustrated in FIG. 22 in accordance with the display information generated by the display control unit 263.

Figure 23:
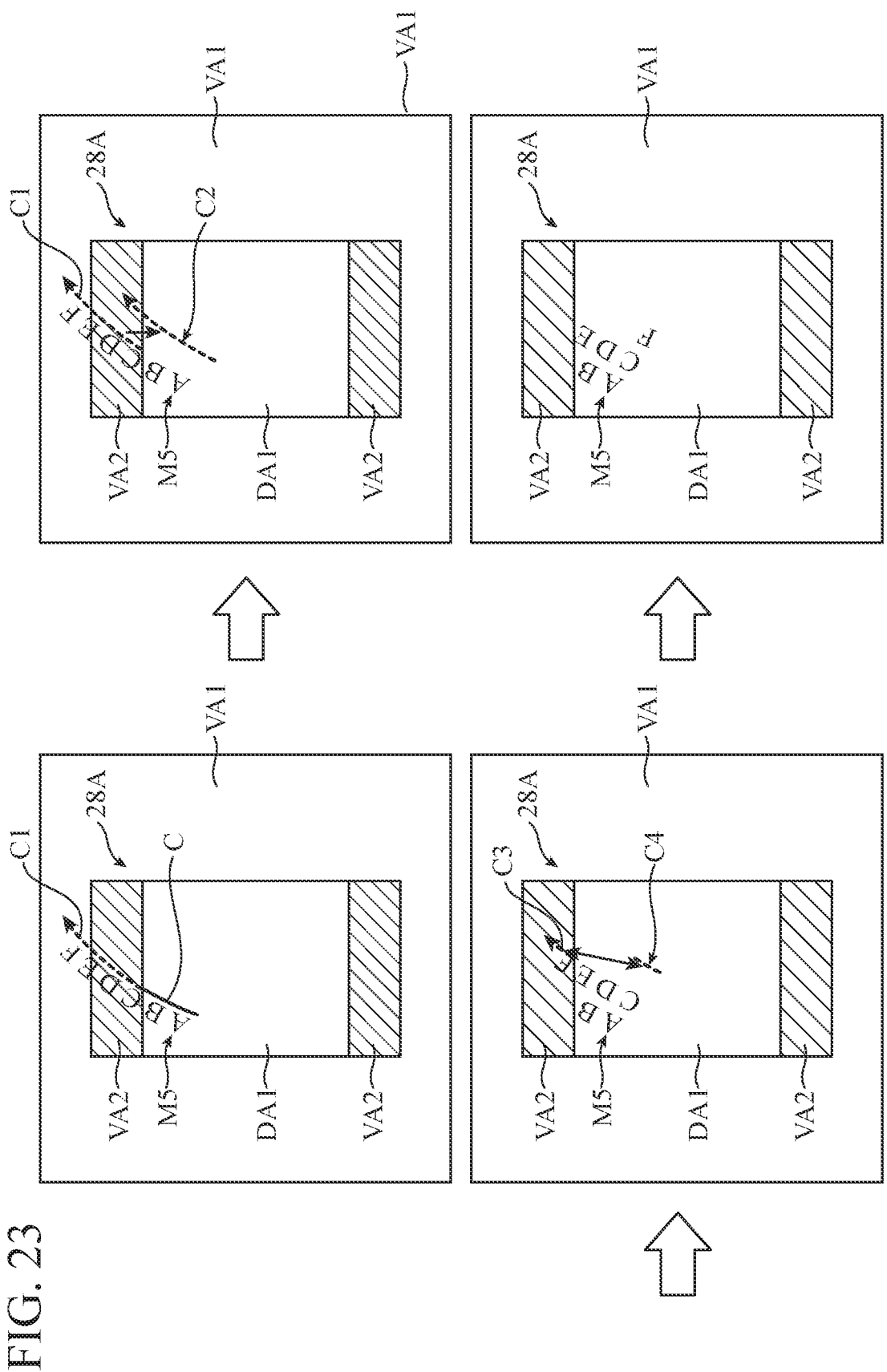
FIG. 23 is an explanatory diagram illustrating a screen example when a part of a character string partially disposed in a virtual region is put on a new line and thereby the entire character string is displayed in a display region of a display.

FIG. 23 is an explanatory diagram illustrating a screen example when a part of the character string M5 partially disposed in the first virtual region VA1 straddling the second virtual region VA2 is put on a new line and thereby the entire character string M5 is displayed in the display region DA1 of the display 28. Since the character string M5 is longer than the curve C reaching the upper end of the display region DA1, the part of the character string M5 protrudes into the first virtual region VA1 straddling the second virtual region VA2 when the character string M5 is disposed along the curve C. Therefore, the display control unit 263 adds the extension C1 to the curve C to extend the curve C to the first virtual region VA1 straddling the second virtual region VA2, and generates display information in which the part of the character string M5 is disposed in the first virtual region VA1 straddling the second virtual region VA2 along the extended curve C.

Using the display information, the display control unit 263 generates display information in which the character string "CDEF" of the character string M5 is disposed along the curve C2 obtained by automatically putting the extension C1 on a new line, and further the character "F" protruding into the second virtual region VA2 of the character string "CDEF" is disposed along the curve portion C4 obtained after putting the curve portion C3 protruding into the second virtual region VA2 of the curve C2 on a new line. The display 28 displays the entire character string M5 in the display region DA1 as illustrated in FIG. 23 in accordance with the display information generated by the display control unit 263. Accordingly, the entire character string M5 can be automatically displayed in the display region DA1 of the display 28.

Moreover, the display control unit 263 may generate display information for displaying a character string having a length equal to or less than the length of the curve in the display region DA1, the character string being obtained by reducing the size of a character included in a character string partially disposed in any one of the first virtual region VA1, the second virtual region VA2, and the first virtual region VA1 straddling the second virtual region VA2.

For example, after generating display information for the character string partially disposed in the virtual region along the curve extended to the virtual region, the display control unit 263 converts the display information into display information in which the size of the character included in the character string is reduced so that the length of the character string is equal to or less than the length of the curve disposed in the display region DA1. All characters included in the character string may be reduced in size, or a part of the characters may be reduced in size.

The display control unit 263 generates display information for displaying a converted character string in the display region DA1, the converted character string being obtained by converting a character string partially disposed in any one of the first virtual region VA1, the second virtual region VA2, and the first virtual region VA1 straddling the second virtual region VA2 in such a way as to have the same meaning as the character string and have a length shorter than that of the character string.

For example, after generating display information for a character string "3.141592653" partially is disposed in the virtual region along the curve extended to the virtual region, the display control unit 263 converts the display information into display information in which the character string is converted into a character string "π 3.14" having the same meaning as the character string and a shorter length than the character string. Note that the entire character string may be converted, or a part of the character string may be converted.

As described above, in the input display control device 26 according to the second embodiment, the display control unit 263 accepts selection of a character string partially disposed in any one of the first virtual region VA1, the second virtual region VA2, and the first virtual region VA1 straddling the second virtual region VA2, and generates, when an operation of moving the selected character string is accepted, display information for displaying the entire character string in the display region DA1 by moving the character string. By using the generated display information, even in a case where the character string is longer than the curve, the entire character string can be displayed in the display region DA1 of the display 28.

In the input display control device 26 according to the second embodiment, the display control unit 263 generates display information for displaying the entire character string in the display region DA1 by putting, on a new line, the part of the character string partially disposed in any one of the first virtual region VA1, the second virtual region VA2, and the first virtual region VA1 straddling the second virtual region VA2. By using the generated display information, even in a case where the character string is longer than the curve, the entire character string can be automatically displayed in the display region DA1 of the display 28.

In the input display control device 26 according to the second embodiment, the display control unit 263 generates display information for displaying a character string having a length equal to or less than the length of the curve in the display region DA1, the character string being obtained by reducing the size of a character included in the character string partially disposed in any one of the first virtual region VA1, the second virtual region VA2, and the first virtual region VA1 straddling the second virtual region VA2. By using the generated display information, even in a case where the character string is longer than the curve, the entire character string can be automatically displayed in the display region DA1 of the display 28.

Note that combinations of the embodiments, modifications of any components of the embodiments, or omissions of any components in the embodiments are possible.

INDUSTRIAL APPLICABILITY

The input display control device according to the present disclosure can be used for, for example, a terminal that displays a character string on a display.

REFERENCE SIGNS LIST

1: input display system, 2: terminal, 21: operation acceptance unit, 22: character management database (DB), 23: character management unit, 24: path determination unit, 25: character string recognizing unit, 26: input display control device, 27: character string temporary storage unit, 28:

display, 28A, 28B, 28C: screen, 29: communication unit, 30: black line frame, 31: broken line frame, 100: input interface, 101: output interface, 102: communication interface, 103: processing circuit, 104: processor, 105: memory, 251: voice detection unit, 252: voice recognition unit, 253: voice recognition dictionary database (DB), 261: curve information acquiring unit, 262: character string acquiring unit, 263: display control unit, 2631: length comparison unit, 2632: shape decision unit, 2633: curve extension unit, 2634: display processing unit, 2635: virtual region setting unit

The invention claimed is:

1. An input display control device comprising:
processing circuitry to acquire curve information indicating a curve;
to acquire a character string; and
to generate display information for displaying the character string along the curve indicated by the curve information,
wherein the processing circuitry sets a first virtual region around a display region of a display, sets, as a second virtual region, a region which is a part of the display region of the display and which does not display display information shared with a terminal of a communication partner in order to match an aspect ratio with an aspect ratio of the terminal of the communication partner,
in a case where it is determined that a part of the character string protrudes from a remaining region of the display region because a length of the curve reaching an end of the remaining region of the display region of the display is shorter than a length of the character string, extends the curve to any one of the first virtual region, the second virtual region, and the first virtual region straddling the second virtual region, the remaining region of the display region being a region obtained by removing the second virtual region from the display region in which the second virtual region is set, and
generates display information in which the part of the character string is virtually disposed along the extended curve in any one of the first virtual region, the second virtual region, and the first virtual region straddling the second virtual region,
wherein the processing circuitry accepts selection of the character string partially disposed in any one of the first virtual region, the second virtual region, and the first virtual region straddling the second virtual region, and generates, in a case where an operation of moving the selected character string is accepted, display information for displaying the entire character string in the display region without any of the entire character string being displayed in the second virtual region or the first virtual region, and transmitting the generated display information to the terminal of the communication partner so that the terminal of the communication partner which has the aspect ratio corresponding to the display region and does not have the first virtual region or the second virtual region displays the entire character string.

2. The input display control device according to claim 1, wherein the processing circuitry causes the second virtual region to be displayed in the display region of the display in such a way that the second virtual region is distinguished from a region other than the second virtual region.

3. The input display control device according to claim 1, wherein the processing circuitry generates display information for displaying the entire character string in a region other than the second virtual region in the display region by putting, on a new line, the part of the character string partially disposed in any one of the first virtual region, the second virtual region, and the first virtual region straddling the second virtual region.

4. The input display control device according to claim 1, wherein the processing circuitry generates display information for displaying a character string having a length equal to or less than a length of the curve in a region other than the second virtual region in the display region, the character string having the length equal to or less than the length of the curve being obtained by reducing a size of a character included in the character string partially disposed in any one of the first virtual region, the second virtual region, and the first virtual region straddling the second virtual region.

5. The input display control device according to claim 1, wherein the processing circuitry generates display information for displaying a converted character string in a region other than the second virtual region in the display region, the converted character string being obtained by converting the character string partially disposed in any one of the first virtual region, the second virtual region, and the first virtual region straddling the second virtual region in such a way as to have a same meaning as the character string and have a length shorter than that of the character string.

6. An input display control method comprising:
acquiring curve information indicating a curve; acquiring a character string;
generating display information for displaying the character string along the curve indicated by the curve information;
setting a first virtual region around a display region of a display;
setting, as a second virtual region, a region which is a part of the display region of the display and which does not display display information shared with a terminal of a communication partner in order to match an aspect ratio with an aspect ratio of the terminal of the communication partner;
in a case where it is determined that a part of the character string protrudes from a remaining region of the display region because a length of the curve reaching an end of the remaining region of the display region of the display is shorter than a length of the character string, extending the curve to any one of the first virtual region, the second virtual region, and the first virtual region straddling the second virtual region, the remaining region of the display region being a region obtained by removing the second virtual region from the display region in which the second virtual region is set;
generating display information in which the part of the character string is virtually disposed along the extended curve in any one of the first virtual region, the second virtual region, and the first virtual region straddling the second virtual region; and
accepting selection of the character string partially disposed in any one of the first virtual region, the second virtual region, and the first virtual region straddling the second virtual region, and generating, in a case where an operation of moving the selected character string is accepted, display information for displaying the entire character string in the display region without any of the entire character string being displayed in the second virtual region or the first virtual region, and transmitting the generated display information to the terminal of the communication partner so that the terminal of the communication partner which has the aspect ratio corresponding to the display region and does not have the first virtual region or the second virtual region displays the entire character string.

7. An input display system in which terminals share same display information on respective displays by communication, the input display system comprising:
operation acceptance circuitry to accept an operation of drawing a line;
path determination circuitry to determine a path of the line drawn by the operation accepted by the operation acceptance circuitry;
character string recognizing circuitry to recognize a character string to be displayed;
communication circuitry to communicate with a terminal of a communication partner; and
processing circuitry to acquire curve information indicating a curve representing the path determined by the path determination circuitry or curve information received from the terminal of the communication partner by the communication circuitry;
to acquire the character string recognized by the character string recognizing circuitry or a character string received from the terminal of the communication partner by the communication circuitry; and
to generate display information for displaying the character string along the curve indicated by the curve information,
wherein the processing circuitry sets a first virtual region around a display region of a corresponding one of the displays, sets, as a second virtual region, a region which is a part of the display region of the corresponding one of the displays and which does not display display information shared with the terminal of the communication partner in order to match an aspect ratio with an aspect ratio of the terminal of the communication partner,
in a case where it is determined that a part of the character string protrudes from a remaining region of the display region because a length of the curve reaching an end of the remaining region of the display region of the corresponding one of the displays is shorter than a length of the character string, extends the curve to any one of the first virtual region, the second virtual region, and the first virtual region straddling the second virtual region, the remaining region of the display region being a region obtained by removing the second virtual region from the display region in which the second virtual region is set, and
generates display information in which the part of the character string is virtually disposed along the extended curve in any one of the first virtual region, the second virtual region, and the first virtual region straddling the second virtual region,
wherein the processing circuitry accepts selection of the character string partially disposed in any one of the first virtual region, the second virtual region, and the first virtual region straddling the second virtual region, and generates, in a case where an operation of moving the selected character string is accepted, display information for displaying the entire character string in the display region without any of the entire character string being displayed in the second virtual region or the first virtual region, and transmitting the generated display information to the terminal of the communication partner so that the terminal of the communication partner which has the aspect ratio corresponding to the display region and does not have the first virtual region or the second virtual region displays the entire character string.

* * * * *